United States Patent
Hodgkins et al.

(10) Patent No.: US 11,834,340 B2
(45) Date of Patent: Dec. 5, 2023

(54) ZEOLITES THAT INCLUDE TRANSITION METALS AND METHODS FOR MAKING SUCH

(71) Applicants: Saudi Arabian Oil Company, Dhahran (SA); King Abdullah University of Science and Technology, Thuwal (SA)

(72) Inventors: Robert Peter Hodgkins, Dhahran (SA); Omer Refa Koseoglu, Dhahran (SA); Kuo-Wei Huang, Thuwal (SA); Jean-Marie Maurice Basset, Thuwal (SA); Yu Han, Thuwal (SA); Rajesh Parsapur, Thuwal (SA); Anissa Bendjeriou Sedjerari, Thuwal (SA); Sathiyamoorthy Murugesan, Thuwal (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 196 days.

(21) Appl. No.: 17/230,560

(22) Filed: Apr. 14, 2021

(65) Prior Publication Data

US 2022/0340435 A1  Oct. 27, 2022

(51) Int. Cl.

| | |
|---|---|
| *B01J 29/40* | (2006.01) |
| *C01B 39/40* | (2006.01) |
| *B01J 29/04* | (2006.01) |
| *B01J 29/48* | (2006.01) |
| *B01J 29/46* | (2006.01) |
| *B01J 29/42* | (2006.01) |
| *C01B 39/06* | (2006.01) |
| *B01J 29/44* | (2006.01) |
| *B01J 35/10* | (2006.01) |
| *B01J 35/02* | (2006.01) |

(52) U.S. Cl.
CPC .............. *C01B 39/40* (2013.01); *B01J 29/04* (2013.01); *B01J 29/041* (2013.01); *B01J 29/042* (2013.01); *B01J 29/043* (2013.01); *B01J 29/045* (2013.01); *B01J 29/046* (2013.01); *B01J 29/047* (2013.01); *B01J 29/048* (2013.01); *B01J 29/405* (2013.01); *B01J 29/42* (2013.01); *B01J 29/44* (2013.01); *B01J 29/46* (2013.01); *B01J 29/48* (2013.01); *B01J 35/023* (2013.01); *B01J 35/109* (2013.01); *B01J 35/1019* (2013.01); *B01J 35/1023* (2013.01); *B01J 35/1028* (2013.01); *B01J 35/1038* (2013.01); *B01J 35/1042* (2013.01); *B01J 35/1047* (2013.01); *B01J 35/1057* (2013.01); *B01J 35/1061* (2013.01); *C01B 39/06* (2013.01); *C01B 39/065* (2013.01); *B01J 2229/183* (2013.01); *C01P 2002/01* (2013.01); *C01P 2004/62* (2013.01); *C01P 2004/64* (2013.01); *C01P 2006/12* (2013.01); *C01P 2006/14* (2013.01); *C01P 2006/16* (2013.01)

(58) Field of Classification Search
CPC ....... C01B 39/40; C01B 39/06; C01B 39/065; B01J 29/405; B01J 29/42; B01J 29/44; B01J 29/46; B01J 29/48; B01J 29/04; B01J 29/041; B01J 29/042; B01J 29/043; B01J 29/044; B01J 29/045; B01J 29/046; B01J 29/047; B01J 29/048; B01J 2229/183; B01J 37/0018; B01J 35/0013; B01J 35/023; B01J 35/1019; B01J 35/1023; B01J 35/1028; B01J 35/1038; B01J 35/1042; B01J 35/1047; B01J 35/1057; B01J 35/1061; B01J 35/109; C01P 2002/01; C01P 2004/62; C01P 2004/64; C01P 2006/12; C01P 2006/14; C01P 2006/16

USPC .................. 502/60, 61, 73, 74, 77; 423/713
See application file for complete search history.

(56) References Cited

U.S. PATENT DOCUMENTS

| | | | |
|---|---|---|---|
| 5,523,506 A | 6/1996 | Benazzi et al. | |
| 7,976,696 B2* | 7/2011 | Ying | B01J 29/005 208/119 |
| 7,994,085 B2 | 8/2011 | Chaumonnot et al. | |
| 10,196,465 B2 | 2/2019 | Han et al. | |
| 10,427,142 B1* | 10/2019 | Al-Herz | C10G 11/18 |
| 2011/0171121 A1* | 7/2011 | Senderov | C01B 39/026 423/700 |
| 2019/0040159 A1 | 2/2019 | Han et al. | |

FOREIGN PATENT DOCUMENTS

| | | |
|---|---|---|
| WO | 199009845 A1 | 9/1990 |
| WO | 2019035045 A1 | 2/2019 |

OTHER PUBLICATIONS

Shah et al., "Synthesis and characterization of isomorphously zirconium-substituted Mobil Five (MFI) zeolite", Materials Chemistry and Physics 134, 2012, pp. 43-49.*

(Continued)

*Primary Examiner* — Elizabeth D Wood
(74) *Attorney, Agent, or Firm* — DINSMORE & SHOHL LLP

(57) ABSTRACT

Embodiments of the present disclosure relate to zeolites and method for making such zeolites. According to embodiments disclosed herein, a zeolite may have a microporous framework including a plurality of micropores having diameters of less than or equal to 2 nm and a plurality of mesopores having diameters of greater than 2 nm and less than or equal to 50 nm. The microporous framework may include an MFI framework type. The microporous framework may include silicon atoms, aluminum atoms, oxygen atoms, and transition metal atoms. The transition metal atoms may be dispersed throughout the entire microporous framework.

10 Claims, 12 Drawing Sheets

OTHER PUBLICATIONS

Alladin et al., "Thermolysis of silica-supported bis(neopentyl) complexes of titanium and zirconium", Inorganica Chimica Acta, vol. 345, pp. 292-298, 2003.

Alaris, "Titanium Neopentyl supported onto KCC-1 and Al-modified KCC-1 and its Catalytic Application for Ethylene polymerization", Thesis, Aug. 2018.

Astala et al., "The Properties of Methylene-and Amine-Substituted Zeolites from First Principles", Journal of the Americal Chemical Society, vol. 126, pp. 1843-1848, 2004.

Bendjeriou-Sedjerari et al., "A well-defined mesoporous amine silica surface via a selective treatment of SBA-15 with ammonia", Chem. Commun., vol. 48, pp. 3067-3069, 2012.

Bendjeriou-Sedjerari et al., "Bipodal Surface Organometallic Complexes with Surface N-Donor Ligands and Application to the Catalytic Cleavage of C-H and C-C Bonds in n-Butane", Journal of the Americal Chemical Society, vol. 135, pp. 17943-17951, 2013.

Bezerra et al., "CO2 adsorption in amine-grafted zeolite 13X", Applied Surface Science, vol. 314, pp. 314-321, 2014.

Bini et al., "Surface Organometallic Chemistry of Titanium: Synthesis, Characterization, and Reactivity of (ΞSi-O)nTi(CH2C(CH3)3)4-n (n=1,2) Grafted on aerosil Silica and MCM-41", Organometallics, vol. 25, pp. 3743-3376, 2006.

Bonati et al., "Synthesis, Characterization, and Catalytic Properties of Novel Single-Site and Nanosized Platinum Catalysts", Organometallics, vol. 31, pp. 5243-5251, 2012.

Chatti et al., "Amine loaded zeolites for carbon dioxide capture: Amine loading and adsorption studies", Microporous and Mesoporous Materials, vol. 121, pp. 84-89, 2009.

Coperet et al., "Surface Organometallic and Coordination Chemistry toward Single-Site Heterogeneous Catalysts: Strategies, Methods, Structures, and Activities", Chemical Reviews, vol. 116, pp. 323-421, 2016.

Delgado et al., "Characterization of Surface Hydride Hafnium Complexes on Alumina by a Combination of Experiments and DFT Calculations", The Journal of Physical Chemistry, vol. 115, pp. 6757-6763, 2011.

Feher et al., "Silasequioxanes as Ligands in Inorganic and Organometallic Chemistry", Polyhedron, vol. 14, No. 22, pp. 3239-3253, 1995.

Guzman et al., "Supported molecular catalysts: metal complexes and clusters on oxides and zeolites", The Royal Society of Chemistry, Dalton Trans., pp. 3303-3318, Jun. 16, 2003.

Holmes et al., Tetraneopentyltitanium Derived Supported Catalysts, Journal of Catalysis, vol. 176, pp. 173-181, 1998.

Jadhav et al., "Monoethanol Amine Modified Zeolite 13X for CO2 Adsorption at Different Temperatures", Energy & Fuels, vol. 21, pp. 3555-3559, 2007.

Jeantelot et al., "TiO2-supported Pt single atoms by surface organometallic chemistry for photoatalytic hydrogen evolution", Phys. Chem. Chem. Phys., vol. 21, pp. 24429-24440, 2019.

Kampers et al., "Influence of preparation method on the metal cluster size of Pt/ZSM-5 catalysts as studied with extended X-ray adsorption fine structure spectroscopy", J. Phys. Chem., vol. 94, pp. 8574-8578, 1990.

Larabi et al., "Surface Organometallic Chemistry of Titanium on Silica-Alumina and Catalytic Hydrogenolysis of Waxes at Low Temperature", Organometallics, vol. 28, pp. 5647-5655, 2009.

Legagneux et al., "Grafting Reaction of Platinum Organometallic Complexes on Silica-Supported or Unsupported Heteropolyacids", Organometallics, vol. 30, pp. 1783-1793, 2011.

Maksoud et al., "A strategy to convert propane to aromatics (BTX) using TiNp4 grafted at the periphery of ZSM-5 by surface organometallic chemistry", Royal Society of Chemistry, Dalton Transactions, vol. 48, pp. 6611-6620, 2019.

Narasimharao et al., Novel solid basic catalysts by nitridation of zeolite beta at low temperature:, Microporous and Mesoporous Materials, vol. 90, pp. 377-383, 2006.

Pasha et al., "C-H and C-C Activation of n-Butane with Zirconium Hydrides Supported on SBA15 Containing N-Donor Ligands: [(ΞSiNH-)(ΞSiX-)ZrH2], [(ΞSiNH-)(ΞSiX-)2ZrH], and [(ΞSiNΞ)(ΞSiX-)ZrH] (X= -Nh-, -O-). A DFT Study", Organometallics, vol. 33, pp. 3320-3327, 2014.

Quignard et al., "Surface Organometallic Chemistry: Synthesis and Characterization of a Tris(neopentyl)zirconium (IV) Complex Grafted to the surface of a Partially Dehydroxylated Silica", Inorg. Chem., vol. 31, pp. 928-930, 1992.

Song et al., "Meso-Zr—Al-beta zeolite as a robust catalysts for cascade reactions in biomass valorization", Applied Catalysts B: Environmental, vol. 205, pp. 393-403, 2017.

Tosin et al., "Reactivity of Silica-Supported Hafnium Trisneopentyl with Dihydrogen: Formation and Characterization of Silica Surface Hafnium Hydrides and Alkyl Hydride", Organometallics, vol. 26, pp. 4118-4127, 2007.

Xu et al., "Bimetallic Pt-Sn nanocluster from hydrogenolysis of a well-defined surface compound consisting of [(ΞAlO-) Pt(COD)Me] and [(ΞAlO-)SnPh3] fragments for propane dehydrogenation", Journal of Catalysis, vol. 374, pp. 391-400, 2019.

Corker et al., "Catalytic Cleavage of the C-H and C-C Bonds of Alkanes by Surface Organometallic Chemistry: An EXAFS and IR Characterization of a Zr-H Catalyst", Science, vol. 271, pp. 966-969, Feb. 16, 1996.

Quignard et al., "Alkane Activation by a Highly Electrophilic Zirconium Hydride Complex Supported on Silica", J. Chem. Soc. Chem. Commun., 2 pgs. 1991.

\* cited by examiner

ZEOLITES THAT INCLUDE TRANSITION METALS AND METHODS FOR MAKING SUCH

TECHNICAL FIELD

The present disclosure generally relates to porous materials and, more specifically, to zeolites.

BACKGROUND

Materials that include pores, such as zeolites, may be utilized in many petrochemical industrial applications. For example, such materials may be utilized as catalysts in a number of reactions which convert hydrocarbons or other reactants from feed chemicals to product chemicals. Zeolites may be characterized by a microporous structure framework type. Various types of zeolites have been identified over the past several decades, where zeolite types are generally described by framework types, and where specific zeolitic materials may be more specifically identified by various names such as ZSM-5 or Beta.

BRIEF SUMMARY

The present application is directed to zeolites comprising transition metals, as well as methods for making such zeolites and uses for such zoolites. The zeolites may comprise mesopores such that they comprise pores having a diameter of at least 2 nm. Such zeolites may be made by utilizing materials which comprise transition metals as precursors that form the zeolites. As such, the transition metals are not grafted onto a zeolite following zeolite formation. By utilizing such a process for producing the presently disclosed mesoporous zeolites, the transition metal may be dispersed throughout the entirety of the microporous framework of the zeolite. Such zeolites, which include dispersed transition metal, may have favorable catalytic attributes, such as greater catalytic activity and/or greater stability.

In accordance with one or more embodiments of the present disclosure, a zeolite may comprise a microporous framework comprising a plurality of micropores having diameters of less than or equal to 2 nm and a plurality of mesopores having diameters of greater than 2 nm and less than or equal to 50 nm. The microporous framework may comprise an MFI framework type. The microporous framework may comprise silicon atoms, aluminum atoms, oxygen atoms, and transition metal atoms. The transition metal atoms may be dispersed throughout the entire microporous framework.

In accordance with one or more additional embodiments of the present disclosure, a zeolite may be produced by a method comprising combining a cationic polymer and one or more precursor materials to form an intermediate material comprising micropores and calcining the intermediate structure to form the zeolite. The precursor materials may comprise a silicon-containing material, an aluminum-containing material, and a transition metal-containing material. The cationic polymer may act as a structure-directing agent for the formation of the micropores. The cationic polymer may comprise monomers that comprise two or more quaternary ammonium cations or quaternary phosphonium cations connected by a hydrocarbon chain.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
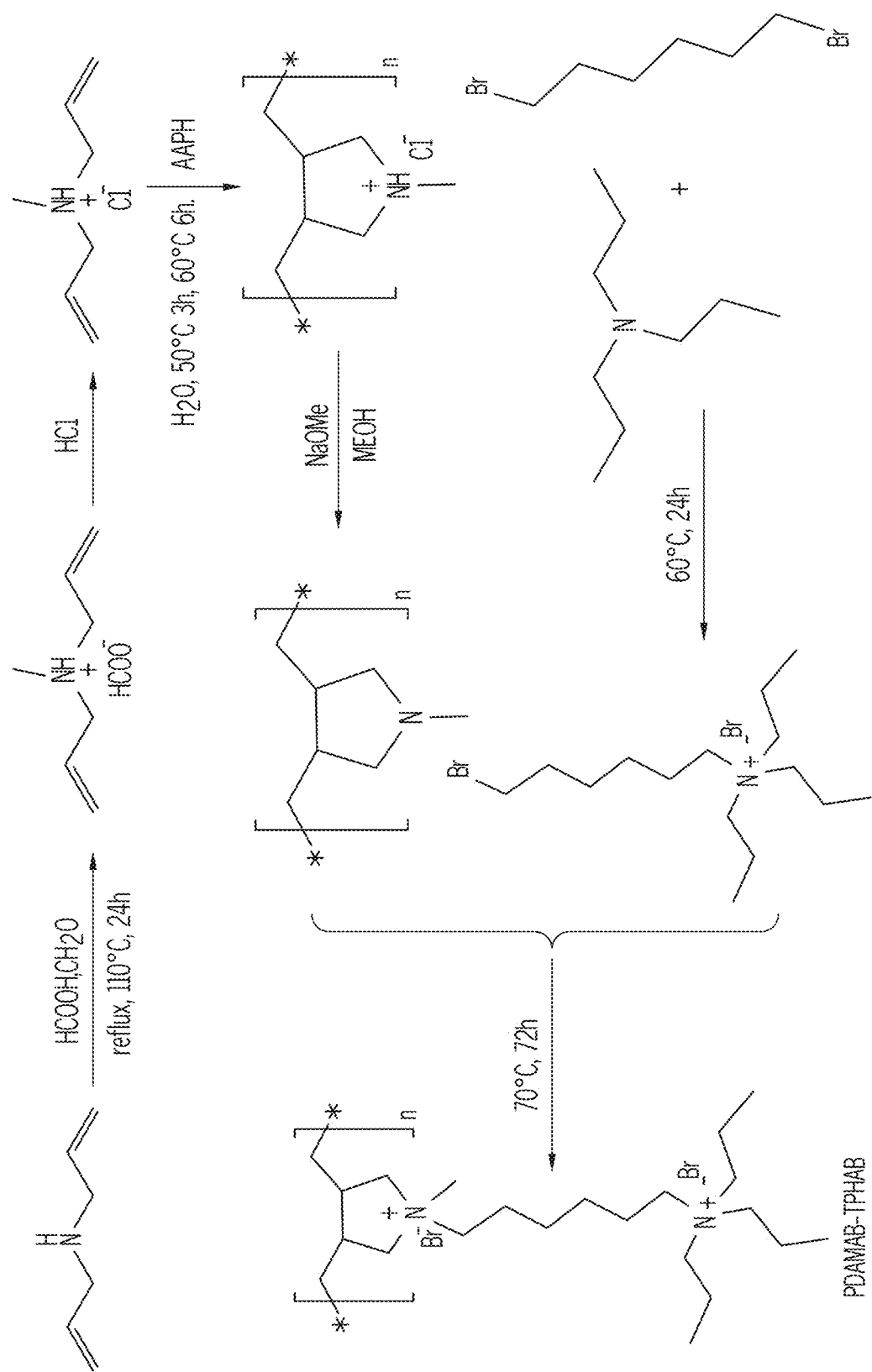
FIG. 1 depicts a reaction pathway to form poly($N^1,N^1$-diallyl-$N^1$-methyl-$N^6,N^6,N^6$-tripropylhexane-1,6-diamonium bromide) (PDAMAB-TMHAB), according to one or more embodiments described in this disclosure.

Embodiments of the present disclosure are directed to mesoporous zeolites that include transition metals. While embodiments of zeolites prepared by the procedures presently disclosed herein, embodiments of the present disclosure should not be considered to be limited to zeolites made by such a process.

As used throughout this disclosure, "zeolites" may refer to micropore-containing inorganic materials with regular intra-crystalline cavities and channels of molecular dimension. In one or more embodiments, the zeolites described herein may be referred to as "mesoporous zeolites." As such, "zeolites" and "mesoporous zeolites" may be used interchangeably throughout this disclosure for embodiments which include mesopores, as is described in detail herein. Zeolites generally comprise a crystalline structure, as opposed to an amorphous structure such as what may be observed in some porous materials such as amorphous silica. Zeolites generally include a microporous framework which may be identified by a framework type. The microporous structure of zeolites (e.g., 0.3 nm to 2 nm pore size) may render large surface areas and desirable size-/shape-selectivity, which may be advantageous for catalysis. The zeolites described may include aluminosilicates that additionally include transition metals. In embodiments, the zeolites described may include micropores (present in the microstructure of a zeolite), and additionally include mesopores. As used throughout this disclosure, micropores refer to pores in a structure that have a diameter of less than or equal to 2 nm and greater than or equal to 0.1 nm, and mesopores refer to pores in a structure that have a diameter of greater than 2 nm and less than or equal to 50 nm. Unless otherwise described herein, the "pore size" of a material refers to the average pore size, but materials may additionally include mesopores having a particular size that is not identical to the average pore size.

Generally, zeolites may be characterized by a framework type which defines their microporous structure. The zeolites described presently, in one or more embodiments, are not particularly limited by framework type. Framework types are described in, for example, "Atlas of Zeolite Framework Types" by Christian Baerlocher et al, Sixth Revised Edition, Published by Elsevier, 2007, the teachings of which are incorporated by reference herein.

According to one or more embodiments, the zeolites described herein may include at least silicon atoms, aluminum atoms, and oxygen atoms, and may additionally include transition metal atoms. In some embodiments, the microporous framework may include substantially only silicon atoms, aluminum atoms, oxygen atoms, and transition metal atoms. Such zeolites may be referred to as aluminosilicate zeolites that additionally include transition metals.

In embodiments, the zeolites may comprise microstructures (which include micropores) characterized by MFI framework type zeolite. It should be understood that MFI refers to zeolite framework types as identified by its three letter code established by the International Zeolite Association (IZA). Other framework types are contemplated in the presently disclosed embodiments.

In one or more embodiments, the zeolite may be an MFI framework type zeolite, such as a transition metal substituted ZSM-5. As described herein, a "transition metal substituted" type of zeolite refers to zeolites which include transition metals, as described herein, but may be otherwise characterized or resemble known zeolite isotypic framework structure (such as, for example, ZSM-5). "ZSM-5" generally refers to zeolites having an MFI framework type according to the IZA zeolite nomenclature and consisting majorly of silica and alumina, as is understood by those skilled in the art. ZSM-5 refers to "Zeolite Socony Mobil-5" and is a pentasil family zeolite that can be represented by the chemical formula $N_nAl_nSi_{96-n}O_{192} \cdot 16H_2O$, where $0<n<27$. According to one or more embodiments, the molar ratio of silica to alumina in the ZSM-5 may be at least 5. For example, the molar ratio of silica to alumina in the ZSM-5 zeolite may be at least 10, at least 12, or even at least 30, such as from 5 to 30, from 12 to 30, from 5 to 80, from 5 to 300, from 5 to 1000, or even from 5 to 1500. Examples of ZSM-5 zeolite include those commercially available from Zeolyst International, such as CBV2314, CBV3024E, CBV5524G, and CBV28014, and from TOSOH Corporation, such as HSZ-890 and HSZ-891.

Along with micropores, which may generally be defined by a framework type of the zeolite, the zeolites may also comprise mesopores. As used herein a "mesoporous zeolite" refers to a zeolite which includes mesopores, and may have an average pore size of from 1 to 50 nm. The presently disclosed mesoporous zeolites may have an average pore size of greater than 1 nm, such as from 4 nm to 16 nm, from 6 nm to 14 nm, from 8 nm to 12 nm, or from 9 nm to 11 nm. In some embodiments, the majority of the mesopores may be greater than 8 nm, greater than 9 nm, or even greater than 10 nm. The mesopores of the mesoporous zeolites described may range from 2 nm to 40 nm, and the median pore size may be from 8 to 12 nm. In embodiments, the mesopore structure of the zeolites may be fibrous, where the mesopores are channel-like. As described herein, "fibrous zeolites" may comprise reticulate fibers with interconnections and have a dense inner core surrounded by less dense outer fibers. Generally, fibrous zeolites may comprise intercrystalline voids in between the fibers where the voids between the less dense, outer fibers are mesopore sized and give the fibrous zeolite its mesoporosity. The mesoporous zeolites described may be generally silica-containing materials, such as aluminosilicates, borosilicates, pure silicates, or transition metal-substituted zeolites viz., titanosilicates, stannosilicates, etc.

In one or more embodiments, the transition metal atoms may be dispersed throughout the entire microporous framework of the zeolite. For example, the transition metal atoms are included in the interior regions of the zeolite, as opposed to only at or near the outer surface of the zeolite. Such presence of the transition metal atoms only at the surface may be the case where transition metals are grafted to an already formed zeolite. However, in the embodiments presently disclosed, the transition metals may be incorporated into the zeolite during formation of the zeolite and, as such, may be dispersed substantially throughout the entire zeolitic framework.

In one or more embodiments, the transition metal atoms may be incorporated into the microporous framework such that the transition metal atoms are in the microporous framework and contribute to the MFI framework structure. That is, the zeolite containing the transition metal atoms may have the transition metal atoms positioned within the crystalline framework of the zeolite. Such a positioning may be termed isomorphic since the inclusion of the transition metal atoms does not significantly change the crystalline structure of the zeolite (as compared with the aluminosilicate analogue zeolite which is void of transition metal atoms).

In one or more embodiments, that zeolite may comprise the transition metal atoms in an amount of from 0.1 wt. % to 20 wt. %. For example, that zeolite may comprise the transition metal atoms in an amount of from 0.1 wt. % to 1 wt. %, from 1 wt. % to 5 wt. %, from 5 wt. % to 10 wt. %, from 10 wt. % to 15 wt. %, from 15 wt. % to 20 wt. %, or combinations of these ranges.

The mesoporous zeolites described in the present disclosure may have enhanced catalytic activity as compared to non-mesoporous zeolites. Without being bound by theory, it is believed that the microporous structures provide for the majority of the catalytic functionality of the mesoporous zeolites described. The mesoporosity may additionally allow for greater catalytic functionality because more micropores are available for contact with the reactant in a catalytic reaction. The mesopores generally allow for better access to microporous catalytic sites on the mesoporous zeolite, especially when reactant molecules are relatively large. For example, larger molecules may be able to diffuse into the mesopores to contact additional catalytic microporous sites.

According to embodiments, the transition metal may be chosen from IUPAC Group 4-12 elements or lanthanides. For example, in embodiments, the transition metals may be chosen from titanium, zirconium, hafnium, vanadium, niobium, tantalum, chromium, molybdenum, tungsten, iron, cobalt, nickel, rhenium, manganese, thallium, copper, zinc, gallium, indium, germanium, tin, or cerium. As described herein, Group numbers of elements of the periodic table are consistent with IUPAC conventions.

In embodiments, the mesoporous zeolites may have a surface area of greater than or equal to 350 $m^2/g$, greater than or equal to 400 $m^2/g$, greater than or equal to 450 $m^2/g$, greater than or equal to 500 $m^2/g$, greater than or equal to 550 $m^2/g$, greater than or equal to 600 $m^2/g$, greater than or equal to 650 $m^2/g$, or even greater than or equal to 700 $m^2/g$, and less than or equal to 1,000 $m^2/g$.

In one or more other embodiments, the mesoporous zeolites may have a pore volume of greater than or equal to 0.3 $cm^3/g$, greater than or equal to 0.35 $cm^3/g$, greater than or equal to 0.4 $cm^3/g$, greater than or equal to 0.45 $cm^3/g$, greater than or equal to 0.5 $cm^3/g$, greater than or equal to 0.55 $cm^3/g$, greater than or equal to 0.6 $cm^3/g$, greater than or equal to 0.65 $cm^3/g$, or even greater than or equal to 0.7 $cm^3/g$, and less than or equal to 1.5 $cm^3/g$.

In further embodiments, the portion of the surface area contributed by mesopores may be greater than or equal to 20%, greater than or equal to 25%, greater than or equal to 30%, greater than or equal to 35%, greater than or equal to 40%, greater than or equal to 45%, greater than or equal to 50%, greater than or equal to 55%, greater than or equal to 60%, or even greater than or equal to 65%, such as between 20% and 70% of total surface area.

In additional embodiments, the portion of the pore volume contributed by mesopores may be greater than or equal to 20%, greater than or equal to 30%, greater than or equal to 35%, greater than or equal to 40%, greater than or equal to 45%, greater than or equal to 50%, greater than or equal to 55%, greater than or equal to 60%, greater than or equal to 65%, greater than or equal to 70%, or even greater than or equal to 75%, such as between 20% and 80% of total pore volume.

Surface area, average pore size, and pore volume distribution may be measured by $N_2$ adsorption isotherms performed at 77 Kelvin (K) (such as with a Micrometrics ASAP 2020 and 2420 systems). As would be understood by those skilled in the art Brunauer-Emmett-Teller (BET) analysis methods may be utilized.

The mesoporous zeolites described may form as particles that may be generally spherical in shape or irregular globular shaped (that is, non-spherical). In embodiments, the particles have a "particle size" measured as the greatest distance between two points located on a single zeolite particle. For example, the particle size of a spherical particle would be its diameter. In other shapes, the particle size is measured as the distance between the two most distant points of the same particle when viewed in a microscope, where these points may lie on outer surfaces of the particle. The particles may have a particle size from 25 nm to 900 nm, from 25 nm to 800 nm, from 25 nm to 700 nm, from 25 nm to 600 nm, from 25 nm to 500 nm, from 50 nm to 400 nm, from 100 nm to 300 nm, or less than 900 nm, less than 800 nm, less than 700 nm, less than 600 nm, less than 500 nm, less than 400 nm, less than 300 nm, or less than 250 nm. Particle sizes may be determined by visual examination under a microscope.

The mesoporous zeolites described may be formed in a single-crystal structure, or if not single crystal, may consist of a limited number of crystals, such as 2, 3, 4, or 5. The crystalline structure of the mesoporous zeolites may have a branched, fibrous structure with highly interconnected intracrystalline mesopores. Such structures may be advantageous in applications where the structural integrity of the zeolite is important while the ordering of the mesopores is not.

According to one or more embodiments, the mesoporous zeolites described in the present disclosure may be produced by utilizing cationic polymers, as is subsequently described in the present disclosure, as structure-directing agents. The cationic polymers may function as dual-function templates for synthesizing the mesoporous zeolites, meaning that they act simultaneously as a template for the fabrication of the micropores and as a template for the fabrication of the mesopores.

According to various embodiments, the mesoporous zeolites described in the present disclosure may be produced by forming a mixture comprising the cationic polymer structure-directing agent (SDA), such as PDAMAB-TPHAB, and one or more precursor materials which will form the structure of the mesoporous zeolites. The precursor materials may contain the materials that form the porous structures, such as alumina and silica for an aluminosilicate zeolite. Additionally, precursors which include transition metals may be utilized. For example, the precursor materials may be one or more of a transition metal-containing material, a silicon-containing material, and an aluminum-containing material. For example, at least $NaAlO_2$, tetra ethyl orthosilicate, and the cationic polymer may be mixed in an aqueous solution to form an intermediate material that will become a mesoporous aluminosilicate zeolite. It should be appreciated that other precursor materials that include silica or alumina may be utilized. For example, in other embodiments, tetra ethyl orthosilicate and cationic polymers may be combined to form an intermediate material that will become a silicate mesoporous zeolite. Optionally, the combined mixture may be heated to form the intermediate material, and may crystallize under autoclave conditions. The intermediate material may comprise micropores, and the cationic polymer may act as a structure-directing agent in the formation of the micropores during crystallization. The intermediate materials may still contain the cationic polymers which may at least partially define the space of the mesopores following their removal. The products may be centrifuged, washed, and dried, and finally, the polymer may be removed by a calcination step. The calcination step may comprise heating at temperatures of at least about 400° C., 500° C., 550° C., or even greater. In one or more embodiments, the calcining may occur at a temperature from 500° C. to 650° C. Without being bound by theory, it is believed that the removal of the polymers forms at least a portion of the mesopores of the mesoporous zeolite, where the mesopores are present in the space once inhabited by the polymers.

The precursor materials of the mixture, or reagents of the sol-gel, generally determine the material composition of the mesoporous zeolites, such as a transition metal substituted aluminosilicate. A transition metal substituted aluminosilicate mesoporous zeolite may comprise a molar ratio of Si/Al of greater than or equal to 10 and less than 10,000, greater than or equal to 25 and less than 10,000, greater than or equal to 50 and less than 10,000, greater than or equal to 100 and less than 10,000, greater than or equal to 200 and less than 10,000, greater than or equal to 500 and less than 10,000, greater than or equal to 1,000 and less than 10,000, or even greater than or equal to 2,000 and less than 10,000. In a transition metal substituted pure silicate zeolite, a negligible amount or no amount of aluminum is present in the framework of the zeolite, and the Si/Al molar ratio theoretically approaches infinity. As used herein a "pure silicate" refers to a material comprising at least about 99.9 weight percent (wt. %) of silicon and oxygen atoms in the framework of the zeolite. Other materials, including water and sodium hydroxide, may be utilized during the formation of the material but are not present in the framework of the zeolite. A transition metal substituted pure silicalite includes this composition aside from the transition metal components (aside from Ti in titanosilicates).

In one or more embodiments the transition metal-containing material may comprise a nitrate or nitrite. In additional embodiments, the transition metal-containing material may comprise a hydroxide. For example, the transition metal-containing material may be chosen from $Zr(NO_3)_4$, $Ti(NO_3)_4$, $Hf(NO_3)_4$, $V(NO_3)_5$, $Nb(NO_3)_5$, $Ta(NO_3)_5$, $Cr(NO_3)_6$, $Mo(NO_3)_6$, $W(NO_3)_6$, $Mn(NO_3)_2 \cdot (H_2O)_x$, $Re(NO_3)_3 \cdot (H_2O)_x$, $MeRe(=O)_3$, $Fe(NO_3)_3$, $Co(NO_3)_3$, $Ni(NO_3)_2$, $Ce(NO_3)_4 \cdot 8H_2O$, $Th(NO_3)_3$, $Cu(NO_3)_2$, $Zn(NO_3)_2$, $Ga(NO_3)_3$, $In(NO_3)_3$, $Ge(NO_3)_4$, or $Sn(NO_3)_4$. In additional embodiments, the transition metal containing material metal-containing material comprises $[M(OH)_x]$, where M is chosen from Sc, Y, Ti, Zr, Hf, V, Nb, Ta, Cr, Mo, W, Fe, Ru, Os, Co, Rh, Ir, Ni, Pd, Pt, Cu, Ag, Au, Zn and lanthanides (Actinides metals) with variable oxidation states. In additional embodiments, the transition metal containing material metal-containing material may include metal salts, sulfates, metal powders, organic salts, etc.

The cationic polymers presently disclosed may comprise one or more monomers which each comprise multiple cationic functional groups, such as quaternary ammonium cations or quaternary phosphonium cations. The cation functional groups of the monomers may be connected by a hydrocarbon chain. Without being bound by theory, it is believed that the cationic functional groups may form or at least partially aid in forming the microstructure of the mesoporous zeolite (for example, an MFI framework type or BEA framework type) and the hydrocarbon chains and other hydrocarbon functional groups of the polymer may form or at least partially aid in forming the mesopores of the mesoporous zeolite.

The cationic polymers may comprise functional groups which are utilized as SDAs for the fabrication of the zeolite microstructure. Such functional groups, which are believed to form the zeolite microstructure, include quaternary ammonium cations and quaternary phosphonium cations. Quaternary ammonium is generally depicted in Chemical Structure #1 and quaternary phosphonium is generally depicted in Chemical Structure #2.

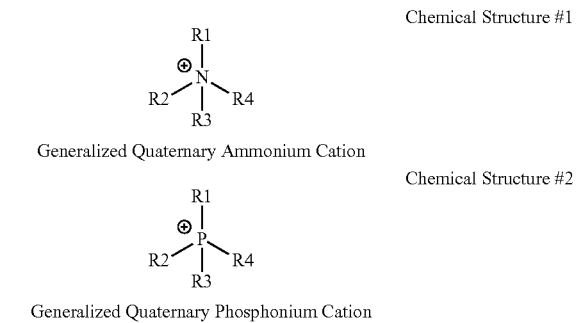

Generalized Quaternary Ammonium Cation

Generalized Quaternary Phosphonium Cation

As used throughout this disclosure, the encircled plus symbols ("+") show cationic positively charged centers. R groups (including R1, R2, R3, R4, R5, R6, R7, R8, R9, R10, R11, R12, and R13) represent chemical constituents. One or more of the various R groups may be structurally identical or may be structurally different from one another.

In Chemical Structure #1 and Chemical Structure #2, R1, R2, R3, and R4 may include hydrogen atoms or hydrocarbons, such as a hydrocarbon chain, optionally comprising one or more heteroatoms. As used throughout this disclosure, a "hydrocarbon" refers to a chemical or chemical moiety comprising hydrogen and carbon. For example, the hydrocarbon chain may be branched or unbranched, and may comprise an alkane hydrocarbon chain, an alkene hydrocarbon chain, or an alkyne hydrocarbon chain, including cyclic or aromatic moieties. In some embodiments, one or more of R1, R2, R3, or R4 may represent hydrogen atoms. As used throughout this disclosure, a heteroatom is a non-carbon and non-hydrogen atom. In embodiments, quaternary ammonium and quaternary phosphonium may be present in a cyclic moiety, such as a five-atom ring, a six-atom ring, or a ring comprising a different number of atoms. For example, in Chemical Structure #1 and Chemical Structure #2, the R1 and R2 constituents may be part of the same cyclic moiety.

In one or more embodiments, the two cation moieties may form ionic bonds with anions. Various anionic chemical species are contemplated, including $Cl^-$, $Br^-$, $F^-$, $I^-$, $OH^-$, $\tfrac{1}{2}SO_4^{2-}$, $\tfrac{1}{3}PO_4^{3-}$, $\tfrac{1}{2}S^{2-}$, $AlO_2^-$, $BF_4^-$, $SbF_6^-$, and $BArF^-$. In some embodiments, an anion with a negative charge of more than 1-, such as 2-, 3-, or 4-, may be utilized, and in those embodiments, a single anion may pair with multiple cations of the cationic polymer. As used throughout this disclosure, a fraction listed before an anionic composition means that the anion is paired with more than one cation and may, for example, be paired with the number of cations equal to its negative charge.

In one or more embodiments, two cations of a monomer may be separated from one another by a hydrocarbon chain. The hydrocarbon chain may be branched or unbranched, and may comprise an alkane hydrocarbon chain, an alkene hydrocarbon chain, or an alkyne hydrocarbon chain, including cyclic or aromatic moieties. In one embodiment, the length of the hydrocarbon chain (measured as the number of carbons in the chain directly connecting the two cations) may be from 1 to 10,000 carbon atoms, such 1 to 20 carbon atom alkane chains.

The cationic polymers described in this disclosure are generally non-surfactants. A surfactant refers to a compound that lowers the surface tension (or interfacial tension) between two liquids or between a liquid and a solid, usually by the inclusion of a hydrophilic head and a hydrophobic tail. Non-surfactants do not contain such hydrophobic and hydrophilic regions, and do not form micelles in a mixture containing a polar material and non-polar material. Without being bound by theory, it is believed that the polymers described are non-surfactants because of the inclusion of two or more cation moieties which are joined by a hydrocarbon chain. Such an arrangement has polar charges on or near each end of the monomer, and such an arrangement excludes the hydrophobic segment from the polymer, and thus the surfactant behavior (self-assembly in solution). On the atomic scale, it is believed that the functional groups (for example, quaternary ammoniums) on the polymer direct the formation of zeolite structure; on the mesoscale, the polymer functions simply as a "porogen" rather than a structure directing agent in the conventional sense. As opposed to the cases of surfactants, non-surfactant polymers do not self-assemble to form an ordered mesostructure, which in turn favors the crystallization of zeolites, producing a new class of hierarchical zeolites that feature three-dimensionally (3-D) continuous zeolitic frameworks with highly interconnected intracrystalline mesopores.

In one embodiment, the cationic polymer may comprise the generalized structure depicted in Chemical Structure #3:

Chemical Structure #3

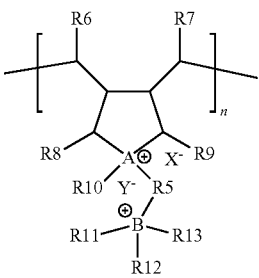

Generalized Cationic Polymer

Chemical Structure #3 depicts a single monomer of the cationic polymer, which is signified by the included bracket, where n is the total number of repeating monomers in the polymer. In some embodiments, the cationic polymer may be a copolymer comprising two or more monomer structures. The $X^-$ and $Y^-$ of Chemical Structure #3 represent anions. It should be understood that one or more monomers (such as that shown in Chemical Structure #3) of the cationic polymers described in the present application may be different from one another. For example, various monomer units may include different R groups. Referring to Chemical Structure #3, A may represent nitrogen or phosphorus and B may represent nitrogen or phosphorus, R5 may be a branched or unbranched hydrocarbon chain having a carbon chain length of from 1 to 10,000 carbon atoms, such as a 2 to 20 carbon alkane, $X^-$ may be an anion and $Y^-$ may be an anion, and R6, R7, R8, R9, R10, R11, R12, and R13 may be hydrogen atoms or hydrocarbons optionally comprising one or more heteroatoms.

Referring to Chemical Structure #3, in one or more embodiments, A may represent nitrogen or phosphorus and B may represent nitrogen or phosphorus. In one embodiment, A and B may be nitrogen, and in another embodiment, A and B may be phosphorus. For example, A of Chemical Structure #3 may comprise a quaternary ammonium cation or a quaternary phosphonium cation. As shown in Chemical Structure #3, A may be a portion of a ring structure, such as a five-sided ring. In one or more embodiments, $X^-$ and $Y^-$ are anions. For example, $X^-$ may be chosen from $Cl^-$, $Br^-$, $F^-$, $I^-$, $OH^-$, $½SO_4^{2-}$, $⅓PO_4^{3-}$, $½S^{2-}$, $AlO_2^-$, $BF_4^-$, $SbF_6^-$, and $BArF^-$, and $Y^-$ may be chosen from $Cl^-$, $Br^-$, $F^-$, $I^-$, $OH^-$, $½SO_4^{2-}$, $⅓PO_4^{3-}$, $½S^{2-}$, $AlO_2^-$, $BF_4^-$, $SbF_6^-$, and $BArF^-$. In embodiments, an anion with a negative charge of more than 1-, such as 2-, 3-, or 4-, may be present, and in those embodiments, a single anion may pair with multiple cations of the cationic polymer.

Still referring to Chemical Structure #3, R5 represents a branched or unbranched hydrocarbon chain. The hydrocarbon chain may be branched or unbranched, and may comprise an alkane hydrocarbon chain, an alkene hydrocarbon chain, or an alkyne hydrocarbon chain. The length of the hydrocarbon chain (measured as the number of carbons in the chain directly connecting A to B) may be from 1 to 10,000 carbon atoms (such as from 1 to 1,000 carbon atoms, from 1 to 500 carbon atoms, from 1 to 250 carbon atoms, from 1 to 100 carbon atoms, from 1 to 50 carbon atoms, from 1 to 25 carbon atoms, from 1 to 20 carbon atoms, from 1 to 15 carbon atoms, from 1 to 10 carbon atoms, from 2 to 10,000 carbon atoms, from 3 to 10,000 carbon atoms, from 4 to 10,000 carbon atoms, from 5 to 10,000 carbon atoms, from 6 to 10,000 carbon atoms, from 8 to 10,000 carbon atoms, from 10 to 10,000 carbon atoms, from 15 to 10,000 carbon atoms, from 20 to 10,000 carbon atoms, from 25 to 10,000 carbon atoms, from 50 to 10,000 carbon atoms, from 100 to 10,000 carbon atoms, from 250 to 10,000 carbon atoms, from 500 to 10,000 carbon atoms, from 2 to 100 carbon atoms, from 3 to 30 carbon atoms, from 4 to 15 carbon atoms, or from 5 to 10 carbon atoms, such as 6 carbon atoms. R5 may comprise one or more heteroatoms, but some embodiments of R5 include only carbon and hydrogen.

In Chemical Structure #3, R6, R7, R8, R9, R10, R11, R12, and R13 may be hydrogen atoms or hydrocarbons optionally comprising one or more heteroatoms, respectively. For example, some of R6, R7, R8, R9, R10, R11, R12, and R13 may be structurally identical with one another and some of R6, R7, R8, R9, R10, R11, R12, and R13 may be structurally different from one another. For example, one or more of R6, R7, R8, R9, R10, R11, R12, and R13 may be hydrogen, or alkyl groups, such as methyl groups, ethyl groups, propyl groups, butyl groups, or pentyl groups. In embodiments, one or more of R6, R7, R8, and R9 may be hydrogen. In embodiments, one or more of R10, R11, R12, and R13 may be an alkyl group. For example, R10 may be a methyl, ethyl, propyl, or butyl group, and one or more of R11, R12, and R13 may be methyl, ethyl, propyl, or butyl groups. In one embodiment, R10 is a methyl group and R11, R12, and R13 are propyl groups. In one embodiment, R11, R12, and R13 are methyl groups. In another embodiment, R11, R12, and R13 are ethyl groups. In another embodiment, R11, R12, and R13 are propyl groups.

In one or more embodiments, Chemical Structure #3 may be a polymer that comprises n monomer units, where n may be from 10 to 10,000,000 (such as from 50 to 10,000,000, from 100 to 10,000,000, from 250 to 10,000,000, from 500 to 10,000,000, from 1,000 to 10,000,000, from 5,000 to 10,000,000, from 10,000 to 10,000,000, from 100,000 to 10,000,000, from 1,000,000 to 10,000,000, from 10 to 1,000,000, from 10 to 100,000, from 10 to 10,000, from 10 to 5,000, from 10 to 1,000, from 10 to 500, from 10 to 250, or from 10 to 100. For example, n may be from 1,000 to 1,000,000.

According to one or more embodiments, the cationic polymer comprises poly($N^1,N^1$-diallyl-$N^1$-alkyl-$N^6,N^6,N^6$-trialkylalkane-1,6-diammonium halide), such as poly($N^1,N^1$- diallyl-$N^1$-methyl-$N^6,N^6,N^6$-trialkylhexane-1,6-diamonium bromide). An example of such is poly($N^1,N^1$-diallyl-$N^1$-methyl-$N^6,N^6,N^6$-tripropylhexane-1,6-diamonium bromide), referred to as (PDAMAB-TPHAB) and shown in Chemical Structure #4.

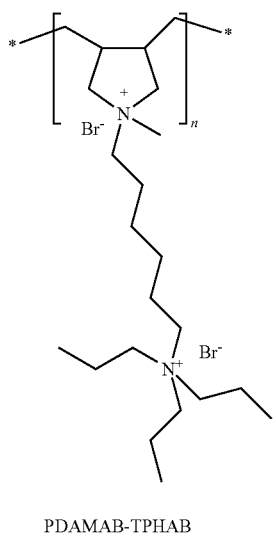

Chemical Structure #4

PDAMAB-TPHAB

In another embodiment, the cationic polymer comprises poly($N^1,N^1$-diallyl-$N^1$-methyl-$N^6,N^6,N^6$-triethylhexane-1,6-diamonium bromide), referred to as (PDAMAB-TEHAB) and shown in Chemical Structure #5.

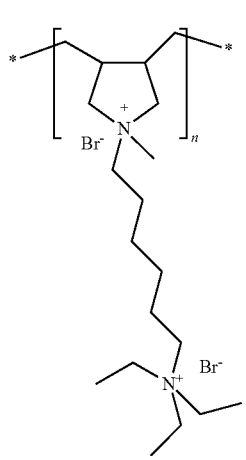

Chemical Structure #5

PDAMAB-TEHAB

In another embodiment, the cationic polymer comprises poly($N^1,N^1$-diallyl-$N^1$-methyl-$N^6,N^6,N^6$-trimethylhexane-1,6-diamonium bromide), referred to as (PDAMAB-TMHAB) and shown in Chemical Structure #6.

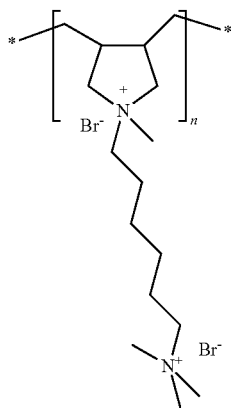

Chemical Structure #6

PDAMAB-TMHAB

The cationic polymers described in the present disclosure, including that of Chemical Structure #3, may be synthesized by a reaction pathway such as that shown in FIG. 1. Specifically, FIG. 1 depicts a reaction pathway for the synthesis of PDAMAB-TPHAB. However, it should be understood that other reaction pathways may be utilized for the synthesis of PDAMAB-TPHAB or other generalized polymers such as the polymer of Chemical Structure #3. Furthermore, it should be understood that the reaction scheme depicted in FIG. 1 may be adapted to form polymers which have a different structure than PDAMAB-TPHAB, such as some polymers included in the generalized Chemical Structure #3 (for example, PDAMAB-TEHAB or PDAMAB-TEHAB). For example, the hydrocarbon chain length between the cation groups A and B of Chemical Structure #3 may be changed by utilizing a different reactant in the scheme of FIG. 1.

Referring to FIG. 1, the cationic polymer of Chemical Structure #3 may be formed by a process comprising forming a diallyl methyl ammonium hydrochloride cation with a chloride anion from diallylamine, polymerizing the diallyl methyl ammonium hydrochloride to form a poly(diallyl methyl ammonium hydrochloride) (PDMAH), forming a poly(diallyl methyl amine) (PDMA) from the poly(diallyl methyl ammonium hydrochloride) (PDMAH), forming an ammonium halide cation with a halide anion by reacting a trialkyl amine, such as a tripropyl amine, with a dihaloalkane, and forming the PDAMAB-TPHAB by reacting the PDMA with the ammonium halide cation. In other embodiments, triethyl amine or trimethyl amine may be utilized as the trialkyl amine.

Still referring to FIG. 1, according to one or more embodiments, the diallyl methyl ammonium hydrochloride cation with a chloride anion may be formed by contacting the diallylamine with formic acid, formaldehyde, and HCl. In other embodiments, the diallyl methyl ammonium hydrochloride may be polymerized by contact with 2,2'-axobis(2-methylpropionamidine) dihydrochloride (AAPH). In additional embodiments, the poly(diallyl methyl amine) (PDMA) may be formed by contacting the poly(diallyl methyl ammonium hydrochloride) (PDMAH) with methane and sodium methoxide.

According to another embodiment, the cationic polymer may be a co-polymer comprising the monomer of the structure depicted in Chemical Structure #3 and the monomer of Chemical Structure #7.

Chemical Structure #7

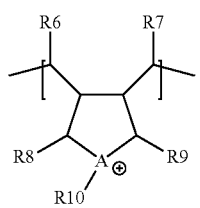

Referring to Chemical Structure #7, in one or more embodiments, A may represent nitrogen or phosphorus. In one embodiment, A may be nitrogen, and in another embodiment, A may be phosphorus. For example, A of Chemical Structure #7 may comprise a quaternary ammonium cation or a quaternary phosphonium cation. As shown in Chemical Structure #7, A may be a portion of a ring structure, such as a five-sided ring. Anions may be present and be attracted to A or B, or both, for example, anions may be chosen from $Cl^-$, $Br^-$, $F^-$, $I^-$, $OH^-$, $\frac{1}{2}SO_4^{2-}$, $\frac{1}{3}PO_4^{3-}$, $\frac{1}{2}S^{2-}$, $AlO_2^-$, $BF_4^-$, $SbF_6^-$, and $BArF^-$. In embodiments, an anion with a negative charge of more than 1-, such as 2-, 3-, or 4-, may be present, and in those embodiments, a single anion may pair with multiple cations of the cationic polymer.

In Chemical Structure #3, R6, R7, R8, R9, R10, may be hydrogen atoms or hydrocarbons optionally comprising one or more heteroatoms, respectively. For example, some of R6, R7, R8, R9, R10 may be structurally identical with one another and some of R6, R7, R8, R9, R10 may be structurally different from one another. For example, one or more of R6, R7, R8, R9, R10, may be hydrogen, or alkyl groups, such as methyl groups, ethyl groups, propyl groups, butyl groups, or pentyl groups. In embodiments, one or more of R6, R7, R8, and R9 may be hydrogen. In embodiments, R10 may be an alkyl group. For example, R10 may be a methyl, ethyl, propyl, or butyl group. In one embodiment, R10 is a methyl group.

An embodiment of cationic polymers comprising the monomer of the structure depicted in Chemical Structure #3 and the monomer of Chemical structure #7 is depicted in Chemical Structure #8.

Chemical Structure #8

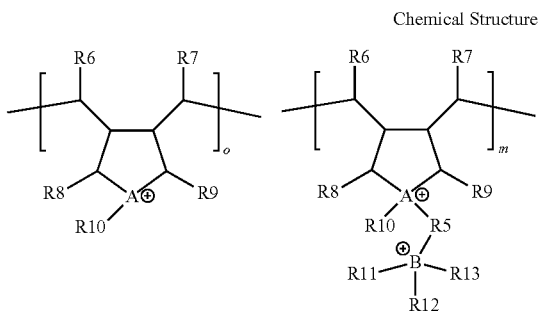

As depicted in Chemical Structure #8, the co-polymer may include the monomeric component of Chemical Structure #3 in "m" parts and the monomeric component of Chemical structure #7 in "o" parts. According to embodiments, the ratio of m/(o+m) may be equal to from 0 to 100%. For example, when m/(o+m)=0%, the cationic polymer may include only the monomeric components depicted in Chemical Structure #7, and when m/(o+m)=100%, the cationic polymer may include only the monomeric components depicted in Chemical Structure #3. In additional embodiments, m/(o+m) may be equal to from 0 to 25%, from 25% to 50%, from 50% to 75%, or from 75% to 100%. In some embodiments, m/(o+m) may be equal to from 25% to 75%, or from 60% to 70%.

In one or more embodiments, Chemical Structure #7 may be a co-polymer that comprises (o+m) monomer units, where (o+m) may be from 10 to 10,000,000 (such as from 50 to 10,000,000, from 100 to 10,000,000, from 250 to 10,000,000, from 500 to 10,000,000, from 1,000 to 10,000,000, from 5,000 to 10,000,000, from 10,000 to 10,000,000, from 100,000 to 10,000,000, from 1,000,000 to 10,000,000, from 10 to 1,000,000, from 10 to 100,000, from 10 to 10,000, from 10 to 5,000, from 10 to 1,000, from 10 to 500, from 10 to 250, or from 10 to 100. For example, (o+m) may be from 1,000 to 1,000,000.

The monomer of Chemical Structure #8 may, in one embodiment, be formed by supplying a lesser molar amount of ammonium halide cation, such that only a portion of the PDMA reacts with ammonium halide cation. In such an embodiment, the non-cation substituted PDMA monomers are representative of the monomers of Chemical Structure #7 and the cation substituted monomers are representative of the monomers of Chemical Structure #3.

In one or more embodiments, the presently disclosed zeolites may be suitable for use as catalysts in refining, petrochemicals, and chemical processing. For example, zeolites may be useful as cracking catalysts in processes such as hydrocracking or fluid catalytic cracking. Table 1 shows some contemplated catalytic functionality for the presently disclosed zeolites. However, it should be understood that the description of Table 1 should not be construed as limiting on the possible uses for zeolites presently disclosed.

TABLE 1

| Catalytic Reaction | Target Description | Framework of zeolite components of catalyst |
|---|---|---|
| Catalytic cracking | To convert high boiling, high molecular mass hydrocarbon fractions to more valuable gasoline, olefinic gases, and other products | FAU, MFI |
| Hydrocracking | To produce diesel with higher quality | BEA, FAU |
| Gas oil hydrotreating/ Lube hydrotreating | Maximizing production of premium distillate by catalytic dewaxing | FAU, MFI |
| Alkane cracking and alkylation of aromatics | To improve octane and production of gasolines and BTX | MFI |
| Olefin oligomerization | To convert light olefins to gasoline & distillate | FER, MFI |
| Methanol dehydration to olefins | To produce light olefins from methanol | CHA, MFI |
| Heavy aromatics transalkylation | To produce xylene from C9+ | FAU, MFI |
| Fischer-Tropsch Synthesis FT Complex or post-FT transformations | To produce gasoline, hydrocarbons, and linear alpha-olefins, mixture of oxygenates | MFI |
| $CO_2$ to fuels and chemicals | To make organic chemicals, materials, and carbohydrates | MFI |

In embodiments where mesopores are present in the zeolite, relatively large hydrocarbons, such as vacuum gas oils, may have access to interior catalytic sites on the zeolites. Additionally, since organometallic moieties may be present in the interior regions where relatively large hydrocarbons may diffuse, the relatively large hydrocarbons may have additional contacting with the organometallic moieties, which may promote additional or alternative catalytic functionality as compared with the catalytic sites on the zeolite framework.

According to additional embodiments, the presently disclosed zeolites may be suitable for use in separation and/or mass capture processes. For example, the presently disclosed zeolites may be useful for adsorbing $CO_2$ and for separating p-xylene from its isomers.

EXAMPLES

The various embodiments of methods and systems for forming zirconium containing fibrous hierarchical ZSM-5 zeolites will be further clarified by the following examples. The examples are illustrative in nature, and should not be understood to limit the subject matter of the present disclosure.

Throughout the various examples, powder X-ray diffraction (PXRD) patterns were recorded on a Bruker D8 Advance diffractometer using Cu Kα radiation. $N_2$ adsorption-desorption isotherms were collected on a Micromeritics ASAP 2420 analyzer at 77 K. Electron microscopy imaging was carried out on a FEI-Titan ST electron microscope operated at 300 kilovolt (kV).

Example 1—Synthesis of PDAMAB-TPHAB Cationic Polymer

A generalized reaction sequence for producing PDAMAB-TPHAB is depicted in FIG. 1. Each step in the synthesis is described in the context of FIG. 1.

In a first step, a methyl amine monomer was synthesized. Diallylamine (1 part equivalent, 0.1 mol) was slowly added to a solution of formic acid (5 equivalent, 0.5 mol) that was cooled to 0° C. in a 500 milliliter (mL) round-bottom flask. To the resulting clear solution a formaldehyde solution (37% solution; 3 equivalent, 0.3 mol) was added and the mixture was stirred at room temperature for 1 hour. Then, the flask was connected to a reflux condenser and the reaction mixture was heated overnight at 110° C. After, the solution was cooled and aqueous HCl (4 N, 2 equivalent, 0.9 mol, 225 mL) was added. The crude reaction product was evaporated to dryness under reduced pressure.

In a second step, a poly(diallyl methyl amine) (PDMA) was synthesized. A 50% aqueous solution of the monomer diallyl methyl ammonium hydrochloride with 3.2% initiator of 2,2'-azobis(2-methylpropionamidine) dihydrochloride (AAPH) was purged with nitrogen for 20 minutes (min). Afterwards, the reaction was stirred under nitrogen atmosphere at 50° C. for 3 hours, and then the reaction was increased to 60° C. for another 6 hours. The product poly(diallyl methyl ammonium hydrochloride) (PDMAH) was purified by dialysis and the water was removed on the rotary evaporator under reduced pressure. Then, the PDMAH (1 part equivalent with respect to monomer unit) was dissolved in a minimum amount of methanol and placed in an ice bath. Subsequently, sodium methoxide (1 part equivalent) dissolved in a minimum amount of methanol, was added. The reaction was stored in a freezer for 1 hour. The PDMA methanol solution was obtained after removing the NaCl with centrifugation.

In a third step, 6-bromo-N,N,N-tripropylhexan-1-aminium bromide (BTPAB) was synthesized. A tripropyl amine (0.05 mol)/toluene mixture (1:1 volume/volume (v/v)) was added to 1,6-dibromohexane (0.1 mol)/acetonitrile (1:1 v/v) slowly at 60° C. under magnetic stirring, and kept at this temperature for 24 hours. After cooling to room temperature and solvent evaporation, the obtained BTPAB was extracted through a diethyl ether—water system that separates excess 1,6-dibromohexane from the mixture.

In a fourth step, PDAMAB-TPHAB was synthesized. For the synthesis of PDAMAB-TPHAB, 1 part equivalent of PDMA (with respect to monomer unit) in methanol was dissolved with 1 part equivalent of BTPAB in acetonitrile/toluene (40 mL, v:v=1:1) and refluxed at 70° C. for 72 hours under magnetic stirring. After cooling to room temperature and then solvent evaporation, the obtained PDAMAB-TPHAB was further purified by dialysis method in water.

Example 2—$^1$H-NMR Analysis of PDAMAB-TPHAB Cationic Polymer

Figure 2:
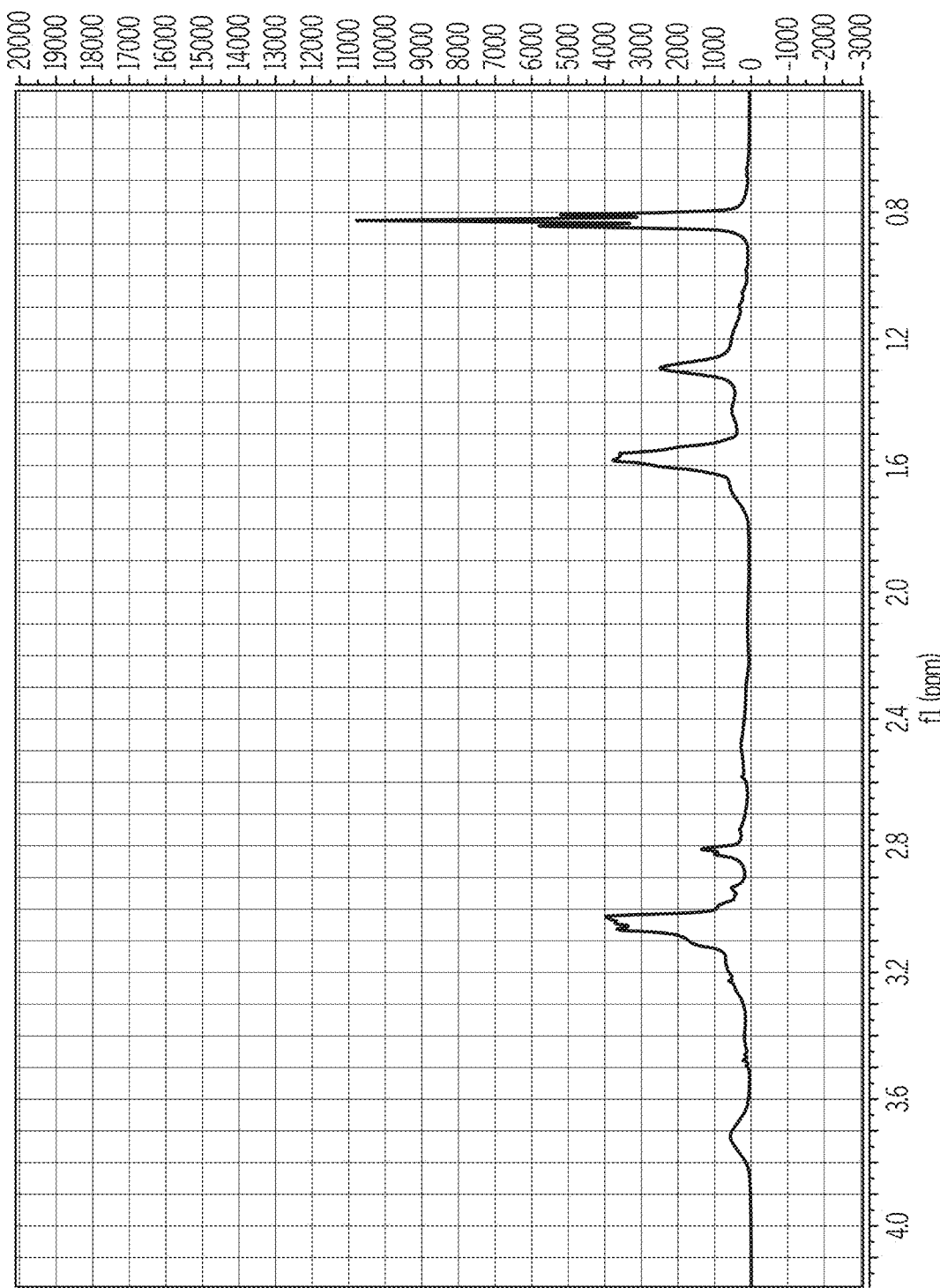
FIG. 2 depicts a Proton Nuclear Magnetic Resonance ($^1$H-NMR) spectrum of PDAMAB-TMHAB as synthesized in Example 1, according to one or more embodiments described in this disclosure.

The PDAMAB-TPHAB polymer synthesized in Example 1 was analyzed by $^1$H-NMR. The $^1$H-NMR spectrum for the polymer produced in Example 1 is depicted in FIG. 2. The $^1$H-NMR spectrum shows peaks at or near 0.85 parts per million (ppm), at or near 1.3 ppm, at or near 1.6 ppm, at or near 2.8 ppm, and at or near 3.05 ppm.

Example 3—Synthesis of Mesoporous ZSM-5 Zeolite with a 48 Hour Crystallization Time A mesoporous ZSM-5 zeolite was formed. First, 0.21 grams (g) of $NaAlO_2$ and 0.75 g NaOH was dissolved in 59.0 g of deionized water with stirring for 0.5 hours. When a clear solution was formed, 2.0 g of PDAMAB-TPHAB was added to the solution and stirred for 1.0 hours. Then, 16.5 g of tetraethyl orthosilicate was added dropwise to the solution and the solution was stirred for 12 hours at 60° C. The molar composition of the mixture was 1 PDAMAB-TPHAB: 20 $SiO_2$: 2.5 $Na_2O$: 0.1 $Al_2O_3$: 800 $H_2O$. The resulting gel was heated to 100° C. for an additional 1-2 hours. Crystallization was conducted in Teflon-lined stainless steel autoclaves at 150° C. for 60 hours. The products were centrifuged, washed with distilled water and methanol, and dried at 110° C. overnight. The polymer template was removed from the as-synthesized material by calcination at 550° C. for 6 hours at a heating rate of 60° C./min under static conditions. Ion exchange was performed using a 1.0 M $NH_4NO_3$ solution at 80° C. A further calcination step was performed at 550° C. for 6 hours under air.

Example 4—Synthesis of Mesoporous ZSM-5 Zeolite with a 60 Hour Crystallization Time A mesoporous ZSM-5 zeolite was formed by the method of Example 3 except that the crystallization time was 48-72 hours.

Figure 3A:
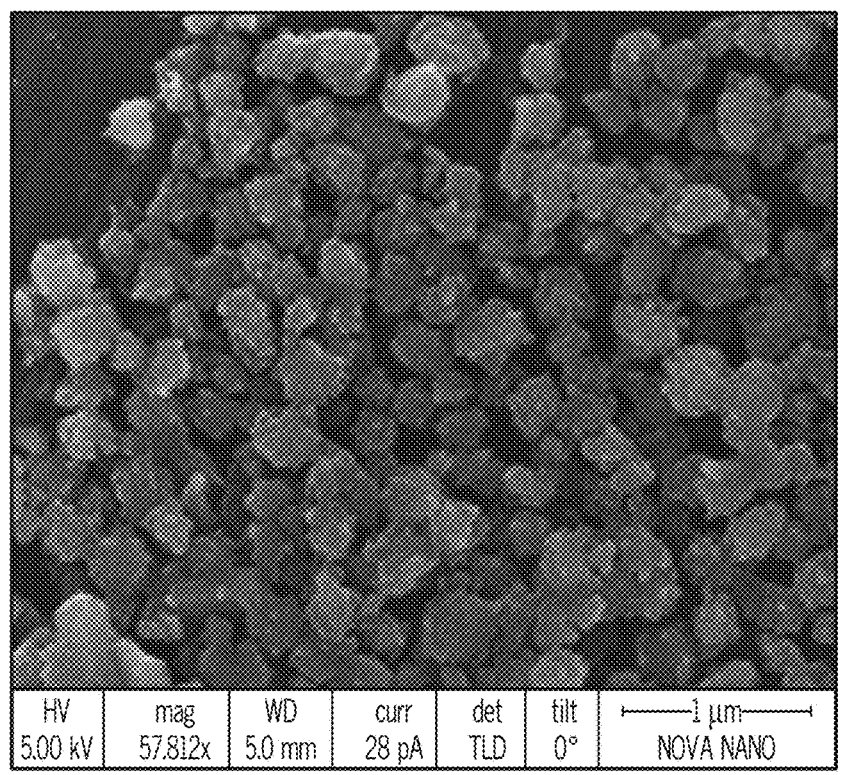
FIGS. 3A and 3B depict Scanning Electron Microscopy (SEM) images of the mesoporous ZSM-5 zeolite of Example 4, according to one or more embodiments described in this disclosure.
Figure 3B:
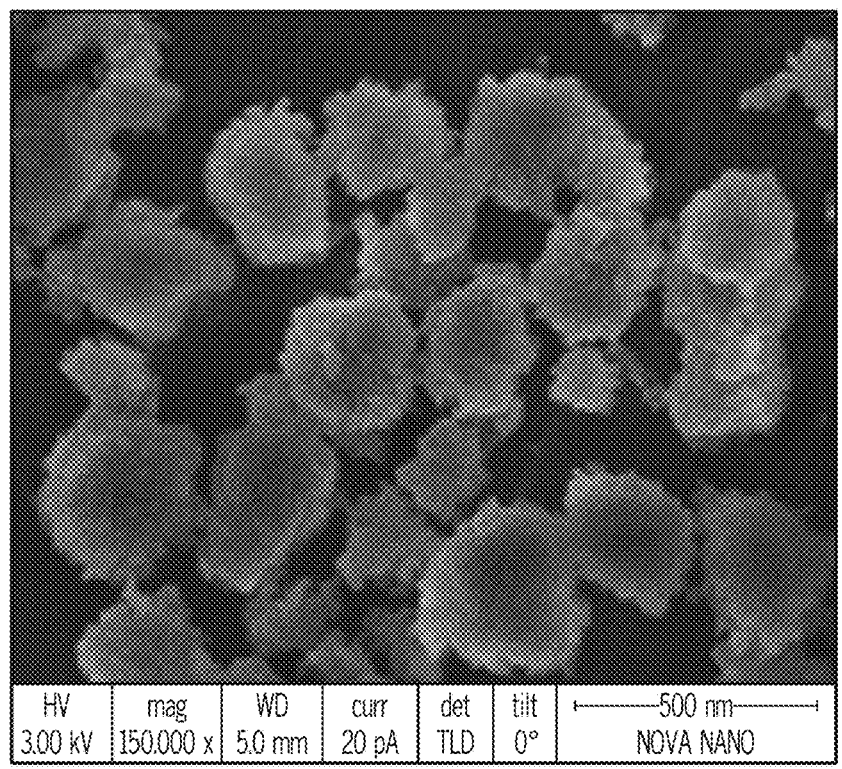

FIG. 3A and FIG. 3B depict scanning electron microscopy (SEM) images of the mesoporous ZSM-5 zeolite of Example 4. The mesoporous ZSM-5 zeolite of Example 4 has a nanofibrous morphology with particle sizes ranging from about 200 to about 400 nm.

Figure 4A:
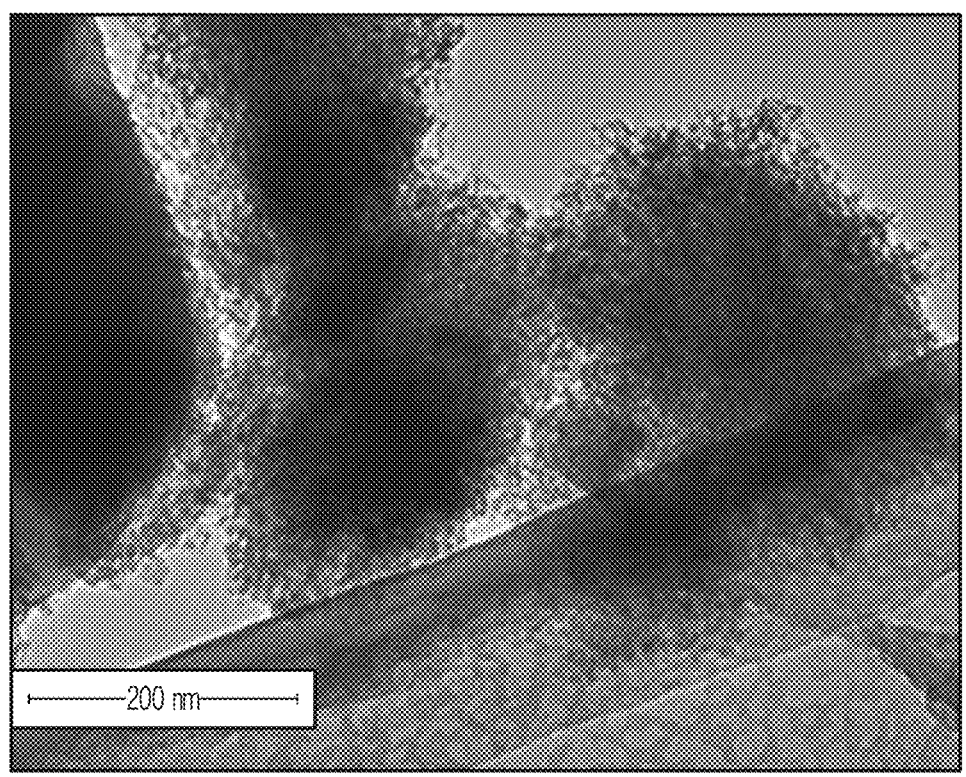
FIGS. 4A to 4C depict Transmission Electron Microscopy (TEM) images of the mesoporous ZSM-5 zeolite of Example 4, according to one or more embodiments described in this disclosure.
Figure 4B:
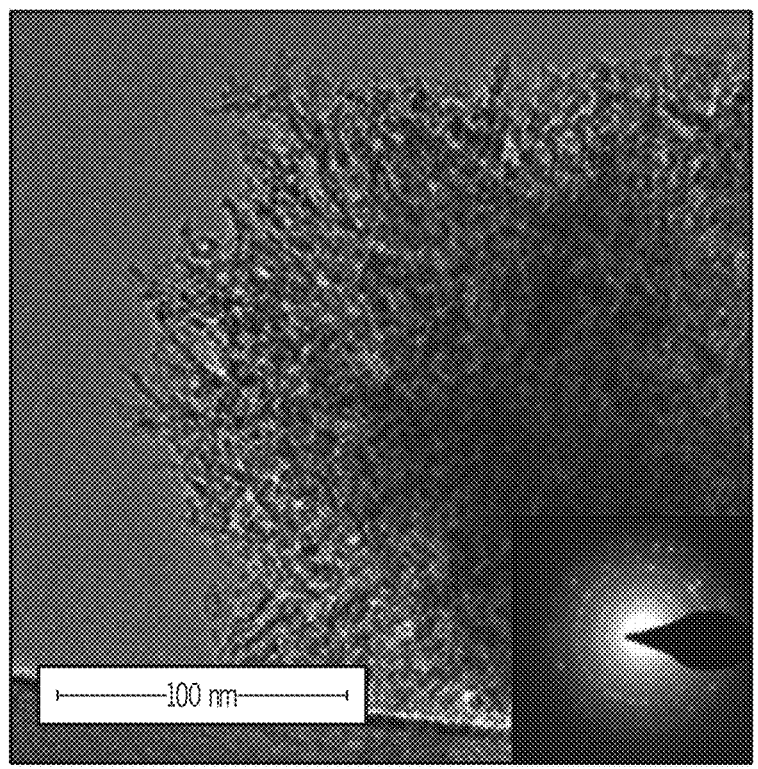
Figure 4C:
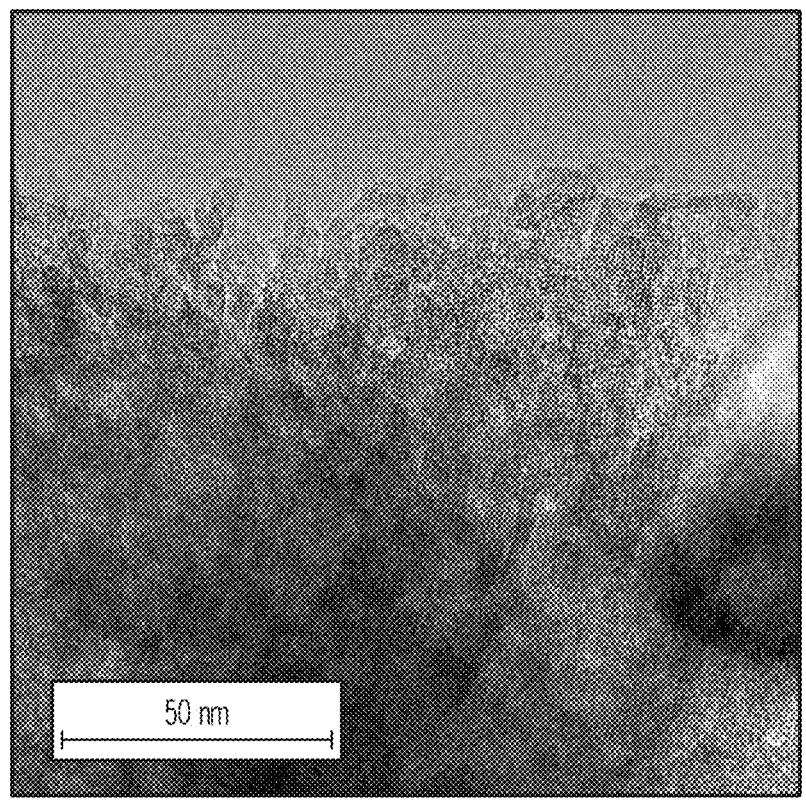

FIG. 4A-FIG. 4C depict transmission electron microscopy (TEM) images of the mesoporous ZSM-5 zeolite of Example 4. Additionally, FIG. 4B contains a selected area electron diffraction pattern of the mesoporous ZSM-5 zeolite of Example 4. These figures display uniform nanocrystals with MFI frameworks. The nanocrystals contain unidimensional nanorods that form interconnected intercrystalline open-type mesopores. The TEM images show that the lattice fringes originate from the MFI frameworks, which indicates the crystalline nature of the ZSM-5 zeolite of Example 4.

Example 5—Synthesis of Mesoporous ZSM-5 Zeolite with a 72 Hour Crystallization Time A mesoporous ZSM-5 zeolite was formed by the method of Example 3 except that the crystallization time was 72 hours.

Example 6—Synthesis of Mesoporous ZSM-5 Zeolite at an Increased Scale

A mesoporous ZSM-5 zeolite was formed by the method of Example 5 where the process was scaled up four times.

Example 7—Synthesis of Zirconium Containing Fibrous Hierarchical ZSM-5 Zeolite A zirconium containing fibrous hierarchical ZSM-5 zeolite was formed. First, 0.21 grams (g) of $NaAlO_2$ and 0.75 g NaOH was dissolved in 56.0 g of water with stirring for 0.5 hours. When a clear solution was formed, 3.0 g of 0.8 wt. % $Zr(NO_3)_4$ dissolved in water was added to the solution dropwise with stirring. Then, 2.0 g of PDAMAB-TPHAB was added to the solution and stirred for 1 hour at 60° C. Then, 16.5 g of tetraethyl orthosilicate was added dropwise to the solution. The solution was further stirred for 12 hours at 60° C. Crystallization was conducted in Teflon-lined stainless steel autoclaves (sized 25 mL) at 150° C. for 60 hours. The products were centrifuged, washed with distilled water and ethanol, and dried at 110° C. overnight. The polymer template was removed from the as-synthesized material by calcination at 550° C. for 6 hours at a heating rate of 60° C./min under static conditions.

Figure 5:
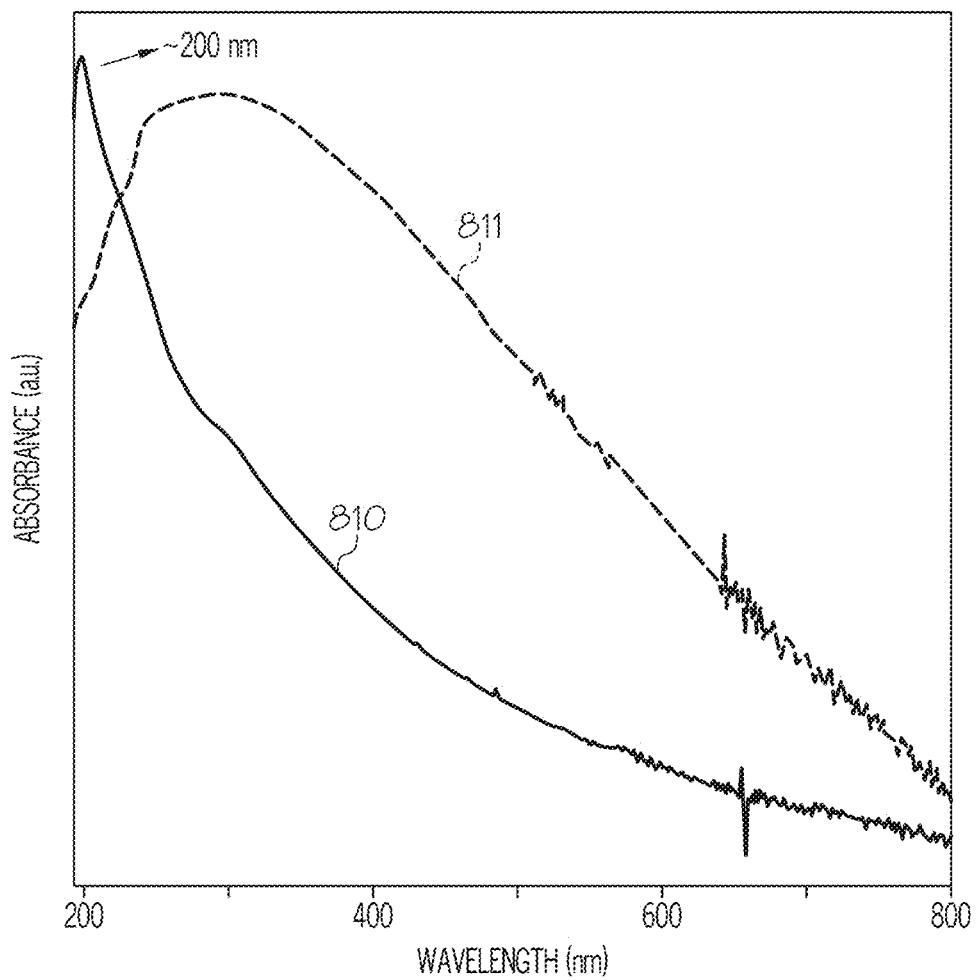
FIG. 5 depicts the UV-visible spectrum of the zirconium containing fibrous hierarchical ZSM-5 zeolite of Example 7, according to one or more embodiments described in this disclosure.

Example 8—Analysis of Zirconium Containing Fibrous Hierarchical ZSM-5 Zeolite The mesoporous ZSM-5 zeolites of Examples 3-6 and the zirconium containing fibrous hierarchical ZSM-5 zeolite of Example 7 were analyzed. FIG. 5 depicts the UV-visible spectrum of the zirconium containing fibrous hierarchical ZSM-5 zeolite of Example 7. Line 810 refers to the UV-visible spectrum of the zirconium containing fibrous hierarchical ZSM-5 zeolite of Example 7 and line 811 refers to the UV-visible spectrum of $ZrO_2$. The UV-visible spectrum of the zirconium containing fibrous hierarchical ZSM-5 zeolite of Example 7 contains a peak at or near 200 nm. This peak is attributed to the ligand-to-metal charge transfer from the $O^{2-}$ to the tetrahedral $Zr^{4+}$ ions.

Figure 6:
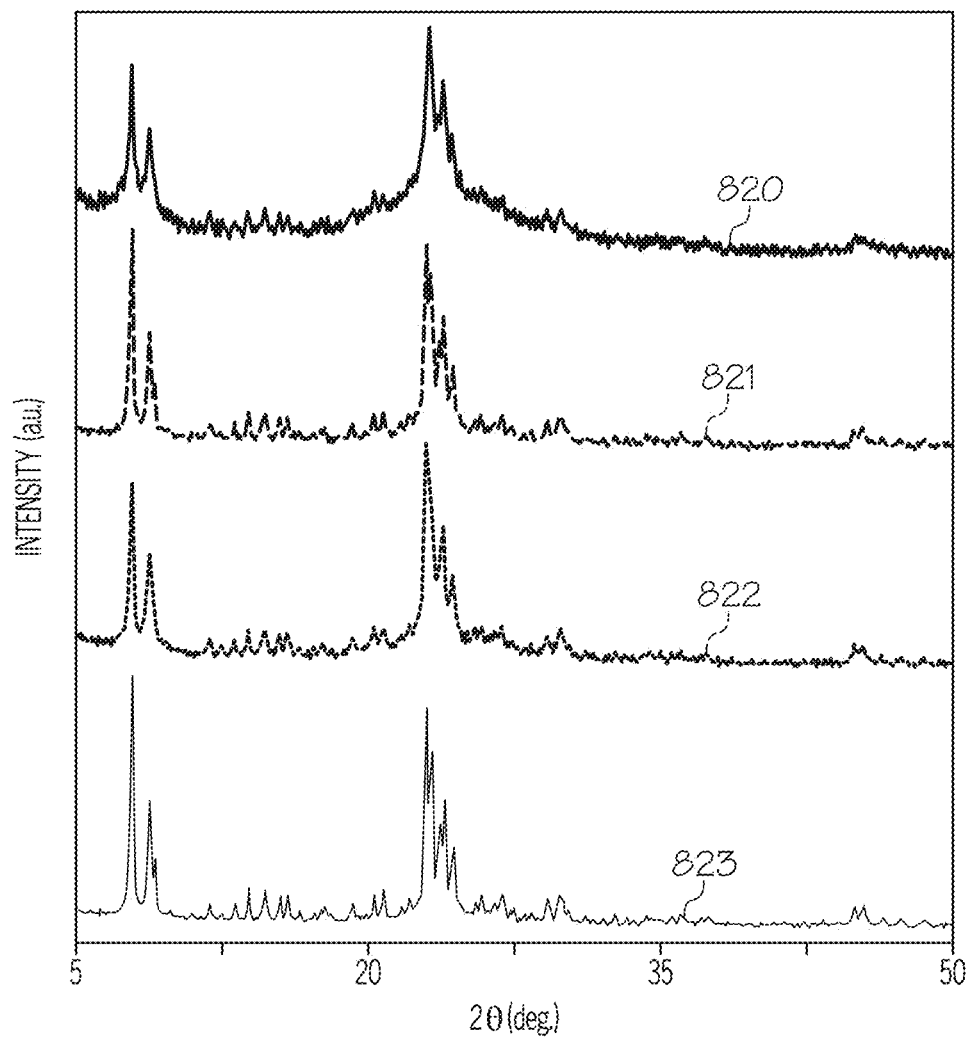
FIG. 6 depicts the Powder X-Ray Diffraction (PXRD) patterns of the mesoporous ZSM-5 zeolites of Examples 3-6, according to one or more embodiments described in this disclosure.

FIG. 6. depicts the powder X-ray diffraction (PXRD) patterns of the mesoporous ZSM-5 zeolites of Examples 3-6. Line 820 corresponds to the PXRD pattern of the mesoporous ZSM-5 zeolite of Example 3, line 821 corresponds to the PXRD pattern of the mesoporous ZSM-5 zeolite of Example 4, line 822 corresponds to the PXRD pattern of the mesoporous ZSM-5 zeolite of Example 5, and line 823 corresponds to the PXRD pattern of the mesoporous ZSM-5 zeolite of Example 6. Each of the PXRD spectra displayed in FIG. 6 contain nearly identical peaks. This suggests that each of the mesoporous ZSM-5 zeolites of Examples 3-6 display the characteristic orthorhombic crystal symmetry typical of MFI-type frameworks. Additionally, the increased crystallization time and process scaling resulted in increased yield and crystallinity without loss of these characteristic structural properties.

Figure 7:
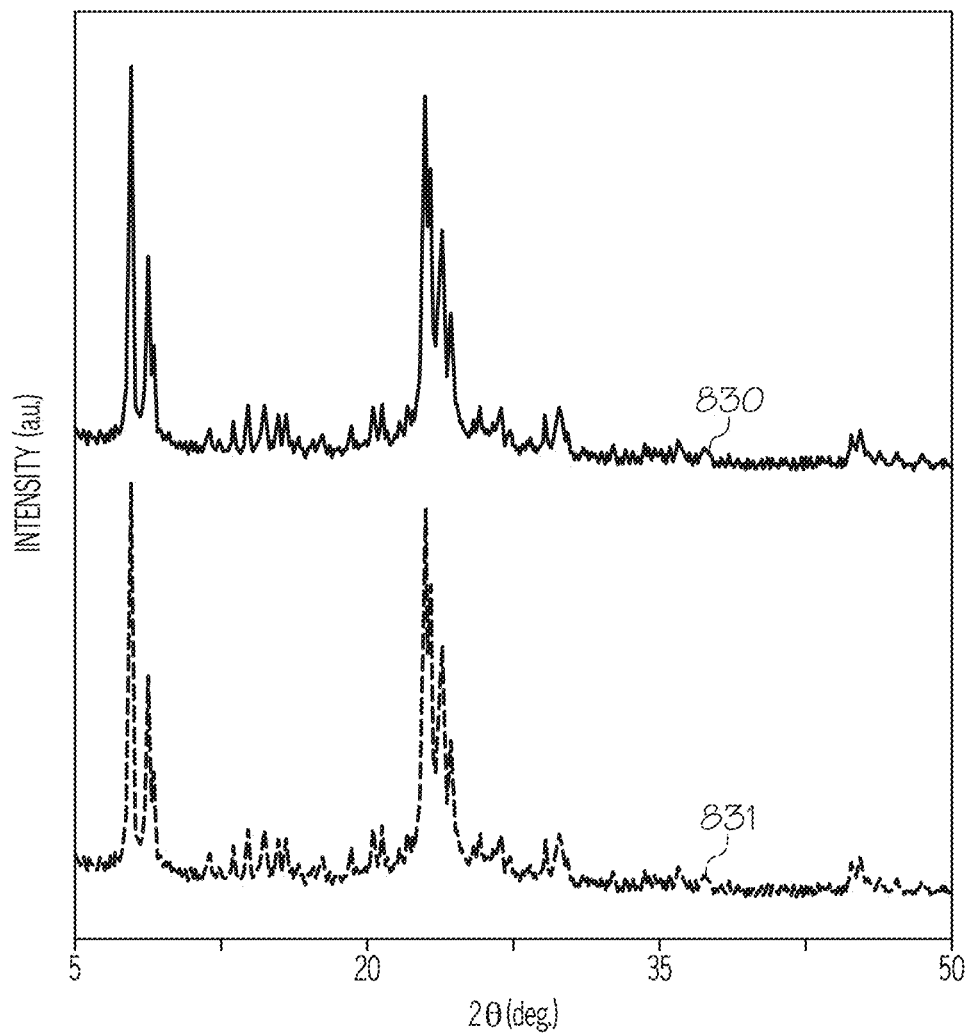
FIG. 7 depicts PXRD patterns of the zirconium containing fibrous hierarchical ZSM-5 zeolite of Example 7 and the mesoporous ZSM-5 zeolite of Example 4, according to one or more embodiments described in this disclosure.

FIG. 7. depicts the PXRD patterns of the zirconium containing fibrous hierarchical ZSM-5 zeolite of Example 7 and the mesoporous ZSM-5 zeolite of Example 4. Line 830 corresponds to the PXRD pattern of the zirconium containing fibrous hierarchical ZSM-5 zeolite of Example 7, and line 831 corresponds to the PXRD pattern of the mesoporous ZSM-5 zeolite of Example 4. The PXRD spectra displayed in FIG. 7 contains nearly identical peaks. This suggests that the substitution of zirconium into the zeolite has not affected the crystallization process or structural properties of the zirconium containing fibrous hierarchical ZSM-5 zeolite of Example 7.

Figure 8:
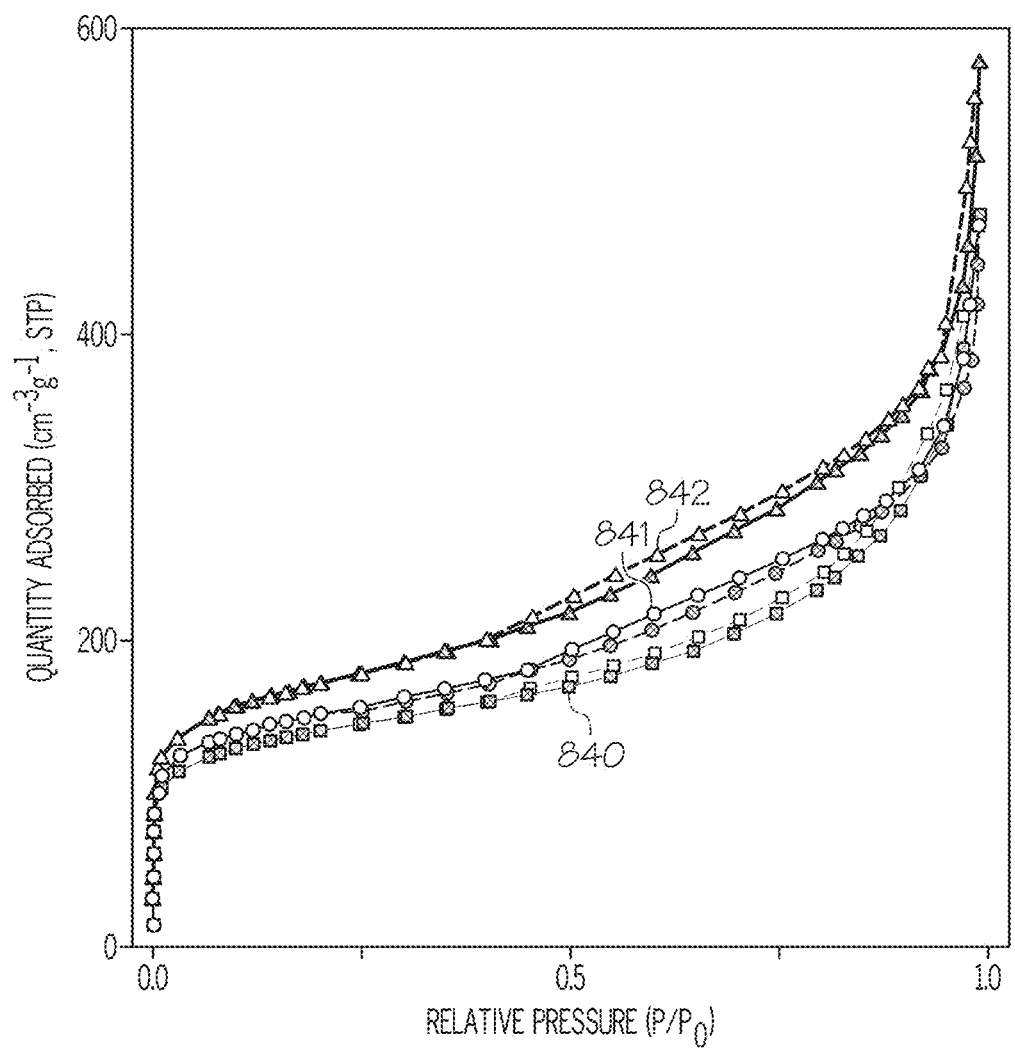
FIG. 8 depicts $N_2$ physisorption isotherms of the mesoporous ZSM-5 zeolites of Examples 4-6, according to one or more embodiments described in this disclosure.
Figure 9:
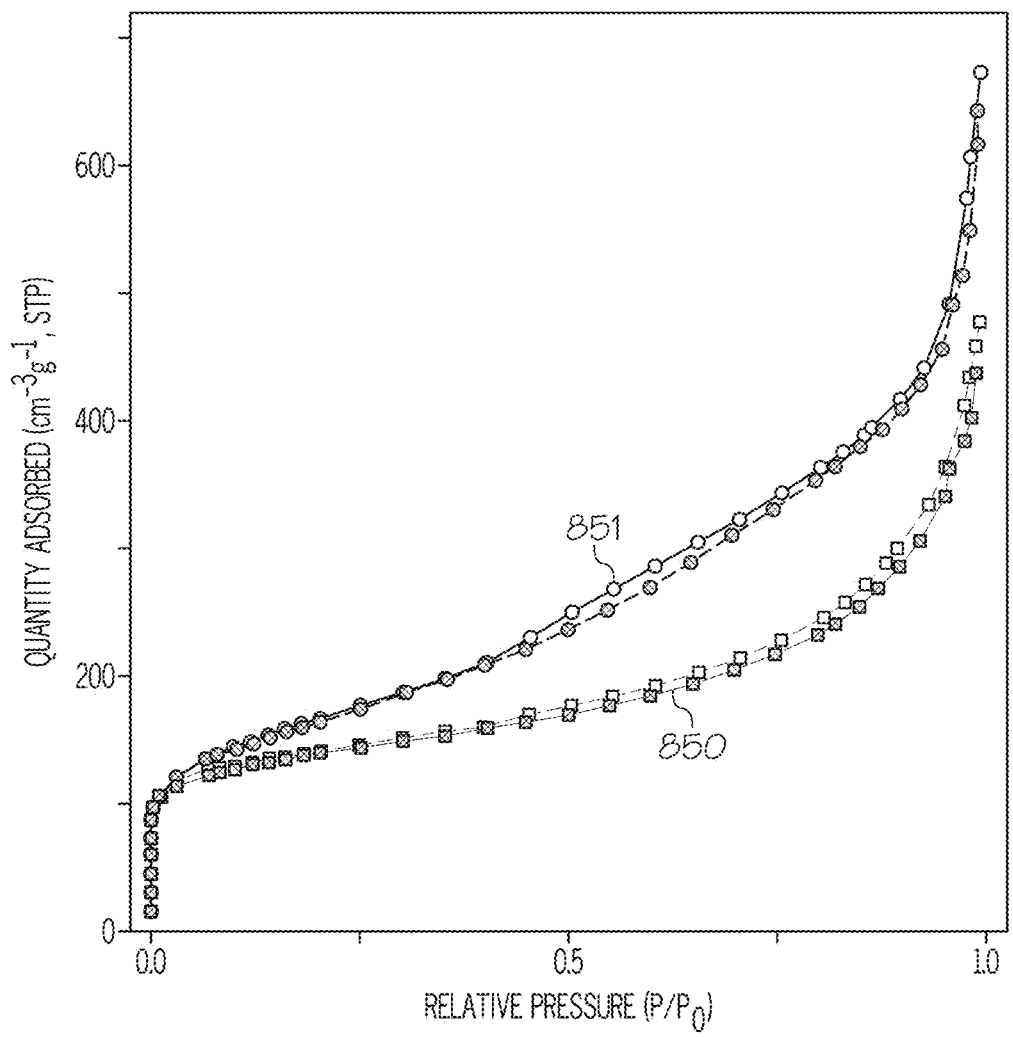
FIG. 9 depicts $N_2$ physisorption isotherms of the mesoporous ZSM-5 zeolite of Example 4 and the zirconium containing fibrous hierarchical ZSM-5 zeolite of Example 7, according to one or more embodiments described in this disclosure.

FIG. 8 depicts the $N_2$ physisorption isotherms of the mesoporous ZSM-5 zeolites of Examples 4-6. Line 840 corresponds to the $N_2$ physisorption isotherm of the mesoporous ZSM-5 zeolite of Example 4, line 841 corresponds to the $N_2$ physisorption isotherm of the mesoporous ZSM-5 zeolite of Example 5, and line 842 corresponds to the $N_2$ physisorption isotherm of the mesoporous ZSM-5 zeolite of Example 6. FIG. 9 depicts the $N_2$ physisorption isotherms for the mesoporous ZSM-5 zeolite of Example 4 and the zirconium containing fibrous hierarchical ZSM-5 zeolite of Example 7. Line 850 corresponds to the $N_2$ physisorption isotherm of the mesoporous ZSM-5 zeolite of Example 4, and line 851 corresponds to the $N_2$ physisorption isotherm of the zirconium containing fibrous hierarchical ZSM-5 zeolite of Example 7. The $N_2$ physisorption isotherms displayed in FIG. 8 and FIG. 9 suggest that the samples contain three levels of pore size, including micropores, mesopores, and macropores. The steep rise in the isotherm when the relative pressure is less than 0.1 is due to the presence of microporosity in the ZSM-5 framework. The narrow hysteresis when the relative pressure is from about 0.4 to about 0.8 can be attributed to the condensation phenomenon in the mesopores. The rise of the isotherms when the relative pressure is above 0.8 can be attributed to the intercrystalline macropores.

Figure 10:
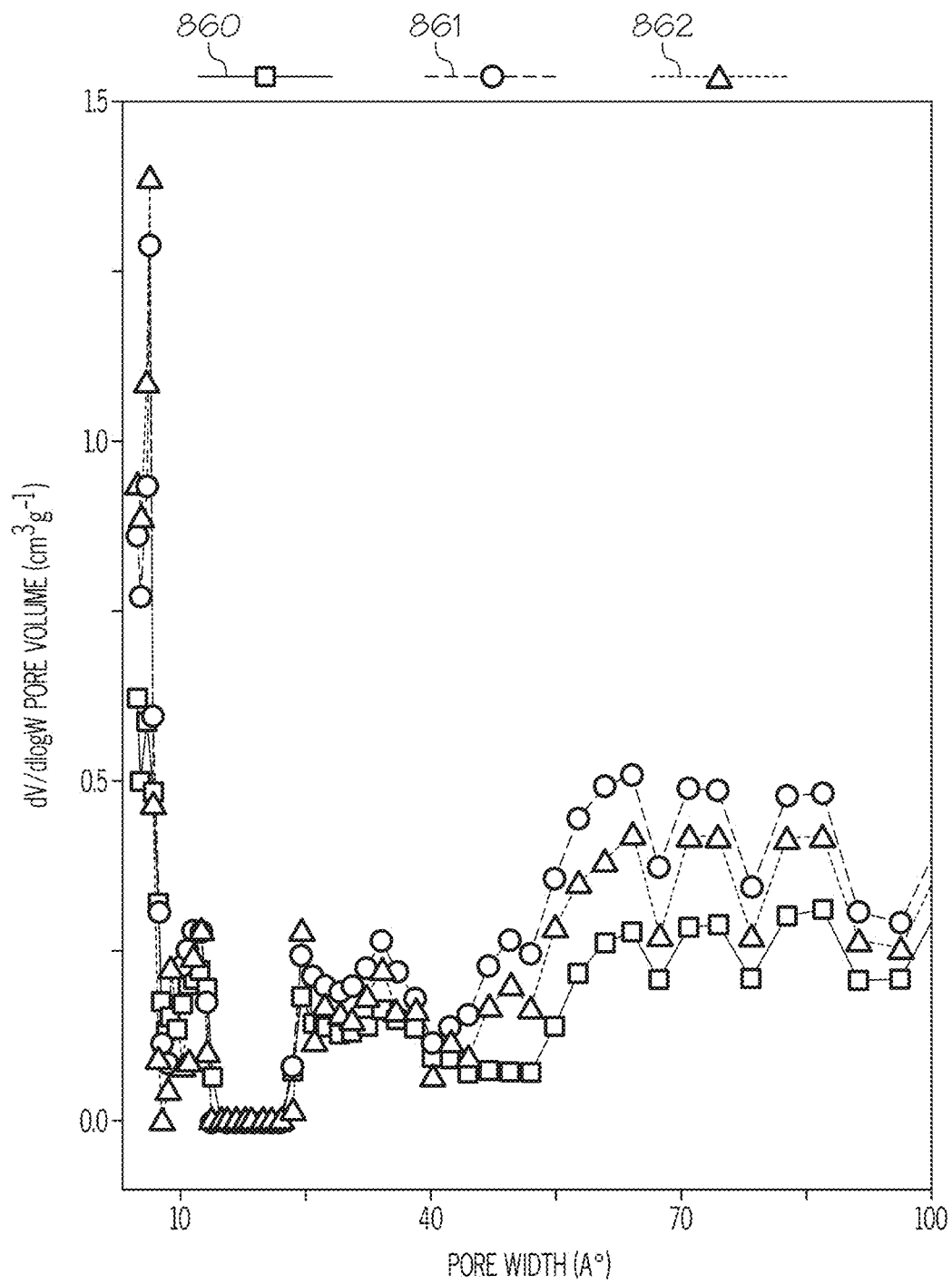
FIG. 10 depicts the pore size distributions of the mesoporous ZSM-5 zeolites of Examples 4-6, according to one or more embodiments described in this disclosure.

The degree of mesoporosity and macroporosity can be controlled by crystallization times. FIG. 10 depicts the pore size distributions of the mesoporous ZSM-5 zeolites of Examples 4-6. Line 860 corresponds to the pore size distribution of the mesoporous ZSM-5 zeolite of Example 4, line 861 corresponds to the pore size distribution of the mesoporous ZSM-5 zeolite of Example 5, and line 862 corresponds to the pore size distribution of the mesoporous ZSM-5 zeolite of Example 6. When crystallization time is increased, there is an increase in macroporosity and slight changes in the pore size and degree of mesoporosity. This may be attributed to the sintering of adjacent unidimensional nanocrystals to form macropores. Since the external surface of the crystals remains similar when different crystallization times are used, the pore size of the crystals can be tuned for various applications by altering the crystallization times.

Table 2 depicts the textural properties of the zeolites of Examples 4-7. It is observed that the zirconium containing fibrous hierarchical ZSM-5 zeolite of Example 7 has a pore volume of 1.04 $cm^3/g$, which is 55% more than the mesoporous ZSM-5 zeolite of Example 4, even though the crystallization time was the same in both Example 4 and Example 7.

TABLE 2

| Sample | Surface Area $(m^2g^{-1})$ | Pore Volume $(cm^3g^{-1})$ |
|---|---|---|
| ZSM-5 (Example 4) | 506 | 0.67 |
| ZSM-5 (Example 5) | 540 | 0.64 |
| ZSM-5 (Example 6) | 601 | 0.82 |
| Zr-ZSM-5 (Example 7) | 589 | 1.04 |

Figure 11A:
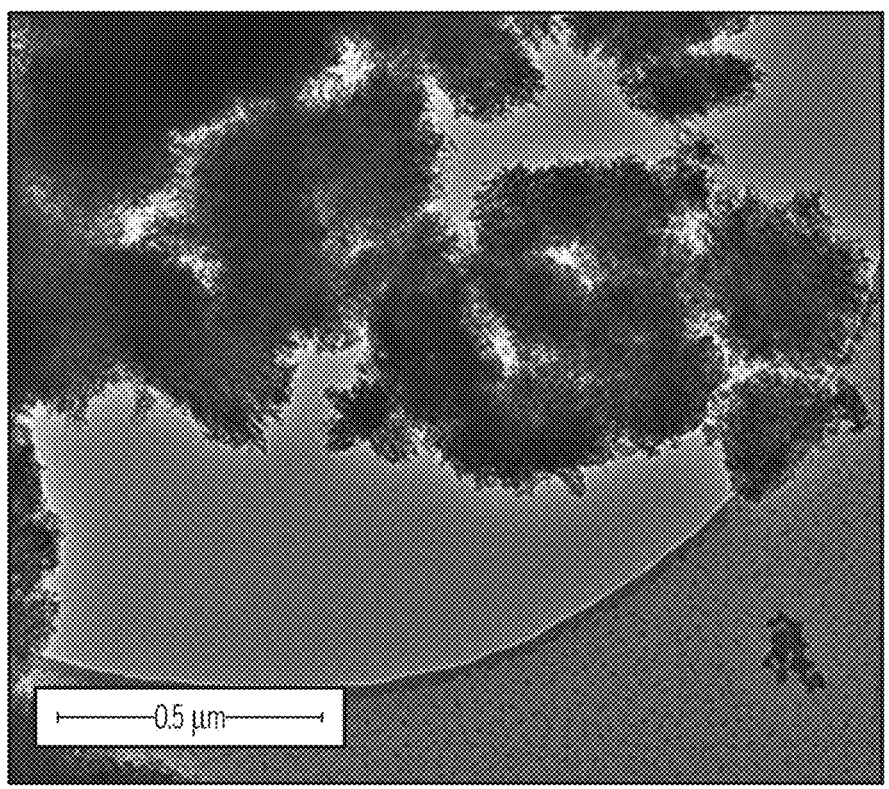
FIGS. 11A to 11B depict Transmission Electron Microscopy (TEM) images of the zirconium containing fibrous hierarchical ZSM-5 zeolite of Example 7, according to one or more embodiments described in this disclosure.
Figure 11B:
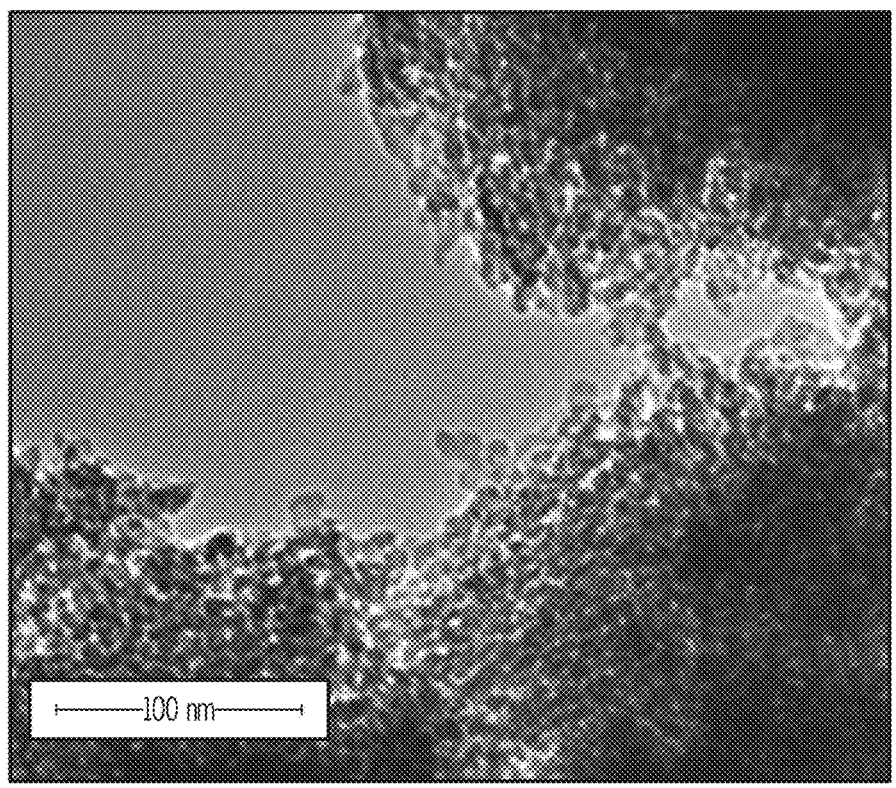

FIGS. 11A and 11B depict TEM images of the zirconium containing fibrous hierarchical ZSM-5 zeolite of Example 7. These figures display uniform nanocrystals with MFI frameworks. The nanocrystals are unidimensional nanorods that form interconnected intercrystalline open-type mesopores. The TEM images show that the lattice fringes originate from the MFI frameworks, which indicates the crystalline nature of the zirconium containing fibrous hierarchical ZSM-5 zeolite of Example 7. Additionally, the TEM images show that the substitution of the zirconium ions into the framework has not affected the desired morphology, structural, or textural properties. However, the TEM images show that the thickness of the rods has slightly increased in the zirconium containing fibrous hierarchical ZSM-5 zeolite of Example 7.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

For the purposes of describing and defining the present disclosure it is noted that the term "about" is utilized in this disclosure to represent the inherent degree of uncertainty that may be attributed to any quantitative comparison, value, measurement, or other representation. The term "about" is also utilized in this disclosure to represent the degree by which a quantitative representation may vary from a stated reference without resulting in a change in the basic function of the subject matter at issue. Additionally, the term "consisting essentially of" is used in this disclosure to refer to quantitative values that do not materially affect the basic and novel characteristic(s) of the disclosure. For example, a chemical stream "consisting essentially" of a particular chemical constituent or group of chemical constituents should be understood to mean that the stream includes at least about 99.5% of a that particular chemical constituent or group of chemical constituents.

It should be understood that any two quantitative values assigned to a property may constitute a range of that property, and all combinations of ranges formed from all stated quantitative values of a given property are contemplated in this disclosure.

In a first aspect of the present disclosure, a zeolite may comprise a microporous framework comprising a plurality of micropores having diameters of less than or equal to 2 nm and a plurality of mesopores having diameters of greater than 2 nm and less than or equal to 50 nm. The microporous framework may comprise an MFI framework type. The microporous framework may comprise silicon atoms, aluminum atoms, oxygen atoms, and transition metal atoms. The transition metal atoms may be dispersed throughout the entire microporous framework.

A second aspect of the present disclosure may include the first aspect where the transition metal atoms may be chosen from IUPAC Group 4-12 elements or lanthanides.

A third aspect of the present disclosure may include either of the first or second aspects where the transition metal atoms may be chosen from titanium, zirconium, hafnium, vanadium, niobium, tantalum, chromium, molybdenum, tungsten, iron, cobalt, nickel, rhenium, manganese, thallium, copper, zinc, gallium, indium, germanium, tin, or cerium.

A fourth aspect of the present disclosure may include any of the first through third aspects where the transition metal may be zirconium.

A fifth aspect of the present disclosure may include any of the first through fourth aspects where the average pore size of the zeolite may be greater than 1 nm.

A sixth aspect of the present disclosure may include any of the first through fifth aspects where the zeolite may comprise particles of from 25 nm to 900 nm in size.

A seventh aspect of the present disclosure may include any of the first through sixth aspects where the zeolite may have an MFI framework type.

A eighth aspect of the present disclosure may include any of the first through seventh aspects where the zeolite may comprise the transition metal atoms in an amount of from 0.01 wt. % to 20 wt. %.

A ninth aspect of the present disclosure may include any of the first through eighth aspects where the zeolite may comprise a surface area of greater than 350 $m^2/g$.

A tenth aspect of the present disclosure may include any of the first through ninth aspects where the zeolite may comprise a pore volume of greater than 0.3 $cm^3/g$.

In an eleventh aspect of the present disclosure, a zeolite may be produced by a method comprising combining a cationic polymer and one or more precursor materials to form an intermediate material comprising micropores and calcining the intermediate structure to form the zeolite. The precursor materials may comprise a silicon-containing material, an aluminum-containing material, and a transition metal-containing material. The cationic polymer may act as a structure-directing agent for the formation of the micropores. The cationic polymer may comprise monomers that comprise two or more quaternary ammonium cations or quaternary phosphonium cations connected by a hydrocarbon chain.

A twelfth aspect of the present disclosure may include the eleventh aspect where the transition metal-containing material comprises IUPAC Group 4-12 elements or lanthanides.

A thirteenth aspect of the present disclosure may include either of the eleventh or twelfth aspects where the transition metal-containing material may comprise titanium, zirconium, hafnium, vanadium, niobium, tantalum, chromium, molybdenum, tungsten, iron, cobalt, nickel, rhenium, manganese, thallium, copper, zinc, gallium, indium, germanium, tin, or cerium.

A fourteenth aspect of the present disclosure may include any of the eleventh through thirteenth aspects where the transition metal-containing material material may comprise zirconium.

A fifteenth aspect of the present disclosure may include any of the eleventh through fourteenth aspects where the transition metal-containing material may be a nitrate.

A sixteenth aspect of the present disclosure may include any of the eleventh through fifteenth aspects where the transition metal-containing material may be chosen from $Zr(NO_3)_4$, $Ti(NO_3)_4$, $Hf(NO_3)_4$, $V(NO_3)_5$, $Nb(NO_3)_5$, $Ta(NO_3)_5$, $Cr(NO_3)_6$, $Mo(NO_3)_6$, $W(NO_3)_6$, $Mn(NO_3)_2 \cdot (H_2O)_x$, $Re(NO_3)_3 \cdot (H_2O)_x$, $MeRe(=O)_3$, $Fe(NO_3)_3$, $Co(NO_3)_3$, $Ni(NO_3)_2$, $Ce(NO_3)_4 \cdot 8H_2O$, $Th(NO_3)_3$, $Cu(NO_3)_2$, $Zn(NO_3)_2$, $Ga(NO_3)_3$, $In(NO_3)_3$, $Ge(NO_3)_4$, or $Sn(NO_3)_4$.

A seventeenth aspect of the present disclosure may include any of the eleventh through sixteenth aspects where the transition metal-containing material may be chosen from a nitrate, a nitride, a hydroxide, a metal salt, or a sulfate.

An eighteenth aspect of the present disclosure may include any of the eleventh through seventeenth aspects where the zeolite may have an MFI framework type.

A nineteenth aspect of the present disclosure may include any of the eleventh through eighteenth aspects where the zeolite may comprise a surface area of greater than 350 m²/g.

A twentieth aspect of the present disclosure may include any of the eleventh through nineteenth aspects where the zeolite may comprise a pore volume of greater than 0.3 cm³/g.

A twenty-first aspect of the present disclosure may include any of the eleventh through twentieth aspects where the cationic polymer may comprise the structure:

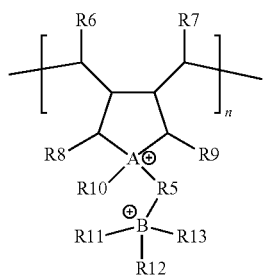

A may be nitrogen or phosphorus and B may be nitrogen or phosphorus. R5 may be a branched or unbranched hydrocarbon chain having a carbon chain length of from 1 to 10,000 carbon atoms Each of R6, R7, R8, R9, R10, R11, R12, and R13 may be hydrogen atoms or hydrocarbons, and each of the hydrocarbons may optionally comprise one or more heteroatoms. Additionally, n is from 10 to 10,000,000.

A twenty-second aspect of the present disclosure may include any of the eleventh through twenty-first aspects where the calcining may be at a temperature from 500° C. to 650° C. and the calcining may remove the cationic polymer from the intermediate structure and forms mesopores.

The invention claimed is:

1. A zeolite comprising:
   a microporous framework comprising a plurality of micropores having diameters of less than or equal to 2 nm, wherein the microporous framework comprises an MFI framework type, and wherein the microporous framework comprises:
   silicon atoms;
   aluminum atoms;
   oxygen atoms; and
   transition metal atoms, wherein the transition metal atoms are dispersed throughout the entire microporous framework; and
   a plurality of mesopores having diameters of greater than 2 nm and less than or equal to 50 nm; and
   wherein the zeolite comprises a pore volume of greater than 0.50 cm³/g.

2. The zeolite of claim 1, wherein the transition metal atoms are chosen from IUPAC Group 4-12 elements or lanthanides.

3. The zeolite of claim 1, wherein the transition metal atoms are chosen from titanium, zirconium, hafnium, vanadium, niobium, tantalum, chromium, molybdenum, tungsten, iron, cobalt, nickel, rhenium, manganese, thallium, copper, zinc, gallium, indium, germanium, tin, or cerium.

4. The zeolite of claim 1, wherein the transition metal is zirconium.

5. The zeolite of claim 1, wherein the average pore size of the zeolite is greater than 1 nm.

6. The zeolite of claim 1, wherein the zeolite comprises particles of from 25 nm to 900 nm in size.

7. The zeolite of claim 1, wherein the zeolite comprises the transition metal atoms in an amount of from 0.01 wt. % to 20 wt. %.

8. The zeolite of claim 1, wherein the zeolite comprises a surface area of greater than 350 m²/g.

9. The zeolite of claim 1, where the zeolite comprises a pore volume of greater than 0.50 cm³/g and less than or equal to 1.5 cm³/g.

10. The zeolite of claim 1, wherein the zeolite is a fibrous zeolite comprising reticulate fibers with interconnections and a dense inner core surrounded by less dense outer fibers.

* * * * *